US012609459B2

(12) United States Patent
Rotenberg et al.

(10) Patent No.: US 12,609,459 B2
(45) Date of Patent: Apr. 21, 2026

(54) WAVEGUIDE ANTENNA

(71) Applicant: Heriot-Watt University, Riccarton (GB)

(72) Inventors: Samuel Rotenberg, Riccarton (GB); Lei Wang, Riccarton (GB); Brian Collins, Riccarton (GB); Pascual Hilario, Riccarton (GB); Carolina Mateo-Segura, Riccarton (GB)

(73) Assignee: Heriot-Watt University, Riccarton (GB)

( * ) Notice: Subject to any disclaimer, the term of this patent is extended or adjusted under 35 U.S.C. 154(b) by 81 days.

(21) Appl. No.: 18/254,896

(22) PCT Filed: Nov. 29, 2021

(86) PCT No.: PCT/GB2021/053102

§ 371 (c)(1),
(2) Date: May 30, 2023

(87) PCT Pub. No.: WO2022/112793

PCT Pub. Date: Jun. 2, 2022

(65) Prior Publication Data

US 2024/0030622 A1 Jan. 25, 2024

(30) Foreign Application Priority Data

Nov. 30, 2020 (GB) ..................................... 2018783

(51) Int. Cl.

| | |
|---|---|
| ***H01Q 21/00*** | (2006.01) |
| ***H01Q 21/06*** | (2006.01) |
| ***H01Q 25/00*** | (2006.01) |

(52) U.S. Cl.

CPC ....... *H01Q 21/0043* (2013.01); *H01Q 21/064* (2013.01); *H01Q 21/068* (2013.01); *H01Q 25/002* (2013.01)

(58) Field of Classification Search

CPC ............. H01Q 21/0043; H01Q 21/064; H01Q 21/068; H01Q 25/002

See application file for complete search history.

(56) References Cited

U.S. PATENT DOCUMENTS

| | | | |
|---|---|---|---|
| 3,696,433 | A | 10/1972 | Killion et al. |
| 5,581,266 | A | 12/1996 | Peng et al. |

(Continued)

FOREIGN PATENT DOCUMENTS

| | | | |
|---|---|---|---|
| CN | 205680784 | U | 11/2016 |
| CN | 106684550 | A | 5/2017 |

(Continued)

OTHER PUBLICATIONS

Singhal Sarthak et al., Asymmetriclly CPW-Fed Hourglass Shaped UWB Monopole Antenna with Defected Ground Plane, Wireless Personal Communications, Springer, Dordrecht, NL, vol. 94, No. 3, Sep. 15, 2016 (Sep. 15, 2016), pp. 1685-1699 (abstract).

(Continued)

*Primary Examiner* — Graham P Smith

(74) *Attorney, Agent, or Firm* — Fox Rothschild LLP; Carol E. Thorstad-Forsyth

(57) ABSTRACT

A radio-frequency antenna comprises a radiating element comprising a plurality n of D-shaped arms, each extending in a respective radial direction relative to a centre of the radiating element and substantially equally spaced around the centre, such that the radiating element is rotationally symmetric.

6 Claims, 20 Drawing Sheets

(56) References Cited

U.S. PATENT DOCUMENTS

| | | | |
|---|---|---|---|
| 5,646,634 | A | 7/1997 | Bokhari et al. |
| 7,830,322 | B1 | 11/2010 | Oliver et al. |
| 2006/0066495 | A1 | 3/2006 | Isoifovich et al. |
| 2012/0013520 | A1 | 1/2012 | Hanson et al. |
| 2012/0092224 | A1 | 4/2012 | Sauleau et al. |

FOREIGN PATENT DOCUMENTS

| | | | |
|---|---|---|---|
| CN | 108232441 | B | 6/2018 |
| CN | 110224219 | B | 10/2020 |
| CN | 111799561 | A | 10/2020 |
| GB | 2572763 | A | 10/2019 |
| KR | 100721871 | B1 | 5/2007 |
| WO | 2020027156 | A1 | 2/2020 |

OTHER PUBLICATIONS

International Search Report and Written Opinion for PCT/GB2021/053102 dated Apr. 21, 2022, 24 pages.

United Kingdom Search Report for GB2018783.7 dated Apr. 28, 2021, 5 pages.

WAVEGUIDE ANTENNA

RELATED APPLICATION DATA

The present application is a National stage filing of PCT/GB2021/053102 filed Nov. 29, 2021, and claims priority to United Kingdom Patent Application No. 2018783.7 filed Nov. 30, 2020. The content of these applications are incorporated herein by reference in their entirety.

FIELD

The present invention relates to a waveguide antenna, for example a meandered leaky-wave antenna.

BACKGROUND

UK patent application GB1805855.2, which is hereby incorporated by reference, describes a linear leaky-wave antenna having beam steering capability from a backward to a forward quadrant at fixed frequency. The linear leaky-wave antenna of GB1805855.2 is based on a meandered metallic waveguide embedded within a cavity. The principle of operation of GB1805855.2 exploits radiation from higher order Floquet Space Harmonics. An engineered mechanical system is incorporated to modify simultaneously all the lengths of the waveguide meanders and thus adjusting the dispersion of the waveguide.

The mechanical system modifies the meander length to achieve a tunable phase variation between consecutive elements of the leaky-wave antenna, which in turn results in a mechanism to scan the beam. The beam is scanned in one dimension.

FIGS. 1A and 1B schematically illustrate meandered leaky-wave antenna 2 in which a mechanical system is used to modify a meander length to achieve a tuneable phase variation between consecutive elements, thereby providing beam scanning in one dimension. The antenna is shown in cross-section in an x-z plane.

A meandered waveguide 4 is formed by a combination of a fixed housing 10, a plurality of first moveable elements 12 and a corresponding plurality of second moveable elements 14. The first moveable elements 12 and second moveable elements 14 may be connected together to form a combined moveable unit (not shown in FIGS. 1A and 1B).

The fixed housing 10 comprises an outer housing 16 which is substantially cuboid in shape, having six walls surrounding an inner cavity or void. A coordinate system is designated such that first and second walls 22, 24 of the outer housing 16 extend in x-y; third and fourth walls 146, 148 (not shown in FIGS. 1A and 1B) of the outer housing 16 extend in x-z; and fifth and sixth walls 26, 28 of the outer housing 16 extend in y-z.

The fixed housing 10 further comprises a plurality of elongate dividing elements 20 that protrude into the internal cavity or void of the outer housing 16. The elongate dividing elements may be considered to be plates or slabs having a y-z orientation and spaced apart in x. The elongate dividing elements 20 are connected to a first wall 22 of the outer housing 16. The elongate dividing elements 20 protrude towards, but do not connect with, a second, opposing wall 24 of the outer housing 10.

The elongate dividing elements 20 may also connect with third and/or fourth walls 146, 148 of the outer housing, which are not shown in the cross-section of FIG. 1A because they would be in x-z planes positioned front of and behind the x-z plane of the illustrated cross-section. The elongate dividing elements are substantially parallel to fifth and sixth walls 26, 28 of the outer housing 16.

A plurality of slots 30 are formed in the second wall 24 of the outer housing 16. For example, the slots may be linear slots. Each of the slots 30 is positioned in line with, and across from an end of, a corresponding one of the elongate dividing elements 20. The slots 30 are evenly spaced and form a linear phased array.

A plurality of recesses or cavities 32 are also formed in the second wall 24. In FIG. 1A, the recesses 32 are positioned between the slots 30. The slots 30 extend through the entire thickness of the second wall 24. In contrast, the recesses 32 are formed on an inner side of the second wall 24 and only extend through part the thickness of the second wall 24.

The first moveable elements 12 may be considered as planes or slabs in a y-z orientation and are substantially parallel to the elongate dividing elements 20 and to the fifth and sixth walls 26, 28. A size and shape of each of the first moveable elements 12 may be similar to a size of each of the elongate dividing elements 20. Each recess 32 is configured to receive a first end of a corresponding first moveable element 12.

In FIG. 1A, each first moveable element 12 is positioned in a first position with regard to its corresponding recess 32. A first end of the first moveable element 12 extends a short distance into the recess 32. FIG. 1B shows an alternative position for the first moveable elements, in which a first end of each first moveable element 12 occupies almost the full length of its corresponding recess 32.

Each second moveable element 14 is positioned facing, and spaced apart from, a second end of a corresponding one of the first moveable elements 12. FIG. 1A shows the second moveable elements 14 in a first position. Each second moveable element 14 sits within the cavity formed by the outer housing 16. In the first position, each second moveable element 14 abuts the first wall 22. Each second moveable element 14 extends laterally in x to fill a lateral gap between neighbouring elongate dividing elements 20, and extends laterally in y to fit between the fifth and sixth walls.

FIG. 1B shows the second moveable elements in a second position, in which the second moveable elements 14 are moved away from the bottom wall 22. The second moveable elements 14 may be considered to form a floor of the meandered waveguide 4.

A first port 40 is positioned in the fifth wall 26 of the outer housing and connects with the meandered waveguide 4. An second port 42 is positioned in the sixth wall 28 of the outer housing and connects with the meandered waveguide 4.

Together, the fixed housing 10, first moveable elements 12 and second moveable elements 14 form the meandered waveguide 4 of the meandered waveguide antenna 2. When the first moveable elements 12 and second moveable elements 14 are moved in concert (for example, between the positions shown in FIG. 1A and the positions shown in FIG. 1B), a length of the meandered waveguide 4 is changed. The first and/or second moveable elements 14, 16 may be attached to the third and/or fourth wall 146, 148 to form a combined moveable unit (not shown) which moves together as one piece.

In use in a transmission mode, radiation is received at the first port 40 and/or second port 42. The radiation passes through the meandered waveguide 4. At least part of the radiation received at the first port 40 and/or second port 42 is emitted through the slots 30. In a receiving mode, radiation is received at slots 30 and passes through the meandered waveguide 4 to first port 40 and/or second port 42.

The slots 30 form a linear phased array. Each slot 30 may radiate with a different phase. A direction of a beam 50, 52 is controlled by the phase differences between the slots 30. A wave travels though the meandered waveguide 4, which may also be described as a delay line. Part of the energy of the wave leaks through each of the slots 30 with different phases.

A phase difference between adjacent slots 30 is dependent on a length of the part of the meandered waveguide 4 between those slots 30. By moving the first moveable elements 12 and second moveable elements 14, the waveguide length between adjacent slots 30 is altered. Therefore, a phase difference between the slots 30 is altered. A change in phase difference between slots 30 results in steering of a beam produced by the slots.

FIG. 1A shows a first beam position 50. FIG. 1B shows a second beam position 52. The change in beam position between the configuration of FIG. 1A and the configuration of FIG. 1B is the result of the movement of the first moveable elements 12 and second moveable elements 14 between the positions shown in FIG. 1A (which result in a longer length of meandered waveguide 4) and the positions shown in FIG. 1B (which result in a shorter length of meandered waveguide 4). The first moveable elements 12 and second moveable elements 14 may also occupy any intermediate positions between the positions shown in FIG. 1A and the positions shown in FIG. 1B. It is noted that a movement of the first moveable elements 12 is made together with a corresponding movement of the second moveable elements 12 and vice versa, thereby maintaining a width of the meandered waveguide 4.

Some antenna applications require an antenna that emits radiation in a narrow frequency band. For example, fixed-frequency operation is desirable for satellite communication systems.

In Satellite On The Move (SOTM) applications, an antenna may be positioned on or in a moving earth station. For example, the antenna may be positioned within an automobile, train or plane. The antenna operates at a fixed frequency for communication with a satellite.

Beam steering of the antenna is used to track the satellite while the earth station is moving. In some circumstances, two-dimensional beam steering is used to steer the beam of the antenna in the elevation plane and in the azimuth plane. Beam steering of the antenna may be used to maintain connection when the antenna is moving; when the target of the antenna (for example, the satellite) is moving; or when both antenna and target are moving.

Existing 2D beam scanning antennas on the market are costly, and may not be competitively priced for Satellite On The Move applications.

SUMMARY

In a first aspect, there is provided a radio-frequency (RF) antenna comprising: a port configured to receive RF radiation; a waveguide coupled to the port; and a plurality of bent slots formed from or coupled to the waveguide, such that RF radiation received through the port passes through the waveguide and is emitted through the bent slots and/or RF radiation received through the plurality of bent slots passes through the waveguide to the port. Each of the bent slots comprises: a central portion having a first width and a first end portion having a second width different from the first width, wherein the first end portion connects to an end of the central portion and extends in a first direction at a first angle with respect to the central portion.

Using a bent slot having portions of different widths and angled with respect to each other may allow a length of the slot to be reduced.

The bent slot may further comprise a second end portion having a third width different from the first width. The second end portion may connect to a further end of the central portion. The second end portion may extend in a second direction at a second angle with respect to the central portion. The second direction may be an opposing direction to the first direction.

The central portion may be narrower than the first end portion. The central portion may be narrower than the second end portion.

A width of the central portion may be less than 0.8 times a width of the first end portion, optionally less than 0.7 times the width of the first end portion, further optionally less than 0.6 times the width of the first end portion, further optionally less than 0.5 times the width of the first end portion. A width of the central portion may be greater than 0.3 times a width of the central portion, optionally greater than 0.4 times the width of the central portion, further optionally greater than 0.5 times the width of the central portion, further optionally greater than 0.6 times the width of the central portion.

A width of the central portion may be between 0.1 mm and 2 mm, optionally between 0.5 mm and 1.5 mm, further optionally between 0.7 mm and 1 mm, further optionally between 0.7 mm and 0.9 mm. A length of the central portion may be between 2 mm and 10 mm, optionally between 4 mm and 8 mm, further optionally between 5 mm and 6 mm.

The bent slot may further comprise at least one further end portion, wherein the or each further end portion is connected to the end of the central portion or to the further end of the central portion. The central portion may be narrower than the at least one further end portion.

The central portion may be wider than the first end portion. The central portion may be wider than the second end portion. The central portion may be wider than the at least one further end portion.

A width of the central portion may be greater than 1.1 times a width of the first end portion, optionally greater than 1.2 times the width of the first end portion, further optionally greater than 1.3 times the width of the first end portion, further optionally greater than 1.4 times the width of the first end portion. A width of the central portion may be less than 2 times a width of the central portion, optionally less than 1.8 times the width of the central portion, further optionally less than 1.6 times the width of the central portion, further optionally less than 1.4 times the width of the central portion.

The plurality of bent slots may comprise a plurality of Z-shaped slots. Each of the plurality of Z-shaped slots may have a second width that is equal to the third width. Each of the plurality of Z-shaped slots may have a first width than is less than the second width and third width. The first angle and second angle may be right angles. The first angle and the second angle may be acute angles. The first angle may be the same as the second angle. A length of the first end portion may be the same as a length of the second end portion. A length of the first end portion may be different from a length of the second end portion.

The plurality of bent slots may comprise a plurality of H-shaped slots or I-shaped slots. The first end portion may extend in both the first and the second direction relative to the central portion. The second end portion may extend in both the first and the second direction relative to the central portion. The second width may be the same as the third width. The first width may be less than the second width and the third width. The first angle and second angle may be right angles. The first angle may be the same as the second angle.

The plurality of bent slots may comprise a plurality of X-shaped slots. The X-shaped slots may be configured to produce circularly-polarised radiation. Each X-shaped slot may comprise a further central portion angled with respect to the central portion to form an X. The X-shaped slots may comprise further end portions such that two end portions are connected to each end of the central portion and two end portions are connected to each end of the further central portion. The end portions and further end portions may form a respective arrowhead shape at each end of the central portion and at each end of the further central portion. The end portions and further end portions may all have the same width. The further central portion may have the same width as the central portion. The end portions and further end portions may have a narrower width than the central portion and further central portions. The first angle may be the same as the second angle. The first angle and second angle may be acute angles.

The first end portion may be parallel to the second end portion. The first angle may be the same as the second angle. The first angle may be a right angle. The second angle may be a right angle. The first width may be the same as the second width.

The waveguide may be a ridged waveguide. The waveguide may be a leaky-wave waveguide. The leaky-wave waveguide may be a meandered leaky-wave waveguide.

The waveguide may be a substrate integrated waveguide. The bent slots may be formed on a printed circuit board (PCB).

The RF radiation may have a characteristic frequency. The bent slots may be arranged in a regular linear array having a fixed separation between bent slots. The fixed separation may be less than a wavelength at the characteristic frequency, optionally less than 0.8 wavelengths, further optionally 0.7 wavelengths, further optionally less than 0.6 wavelengths, further optionally less than 0.5 wavelengths. The fixed separation may be greater than 0.4 wavelengths, optionally greater than 0.5 wavelengths, further optionally greater than 0.6 wavelengths.

The antenna may comprise further regular linear arrays of bent slots that combine with the regular linear array of bent slots to form a regular two-dimensional array. A first dimension of the array and a second, substantially perpendicular dimension of the array may each have a fixed separation between bent slots. The fixed separation may be less than a wavelength at the characteristic frequency, optionally less than 0.8 wavelengths, further optionally 0.7 wavelengths, further optionally less than 0.6 wavelengths, further optionally less than 0.5 wavelengths. The RF radiation may have a range of frequencies. The characteristic frequency may be a central frequency of the range of frequencies of the RF radiation.

The characteristic frequency may be between 1 GHz and 50 GHz. The characteristic frequency may be in Ku band. The characteristic frequency may be between 12 GHz and 18 GHz. The characteristic frequency may be in Ka band. The characteristic frequency may be between 26.5 GHz and 40 GHz.

The range of frequencies may be at least 100 MHz, optionally at least 200 MHz, further optionally at least 250 MHz, further optionally at least 300 MHz. The range of frequencies may be less than 1000 MHz, optionally less than 500 MHz, further optionally less than 300 MHz.

The antenna may comprise a first component part in which the first end portions of the bent slots are formed, and a second component part in which the second end portions of the bent slots are formed.

In a further aspect, there is provided a method comprising: receiving, by a port of an RF antenna, RF radiation; and emitting, by a plurality of bent slots formed from or coupled to a waveguide of the RF antenna, RF radiation received through the port and passed through the waveguide to the plurality of bent slots; wherein each of the bent slots comprises: a central portion having a first width and a first end portion having a second width different from the first width, wherein the first end portion connects to an end of the central portion and extends in a first direction at a first angle with respect to the central portion.

In a further aspect, there is provided a method comprising: receiving, by a plurality of bent slots of an RF antenna, RF radiation, wherein the plurality of bent slots are formed from or coupled to a waveguide of the RF antenna; and receiving, by a port of the RF antenna, RF radiation received by the plurality of bent slots and passed through the waveguide to the port; wherein each of the bent slots comprises: a central portion having a first width and a first end portion having a second width different from the first width, wherein the first end portion connects to an end of the central portion and extends in a first direction at a first angle with respect to the central portion.

In a further aspect, which may be provided independently, there is provided a radio-frequency (RF) antenna comprising a bent slot formed from or coupled to the waveguide, the bent slot comprising a central portion having a first width and a first end portion having a second width different from the first width, wherein the first end portion connects to an end of the central portion and extends in a first direction at a first angle with respect to the central portion.

In a further aspect, which may be provided independently, there is provided a method of manufacturing an RF antenna comprising: forming a first component part comprising first end portions of a plurality of bent slots; forming a second component part comprising second end portions of the plurality of bent slots; and combining the first component part and the second component part to form the antenna; wherein each of the bent slots comprises: a central portion having a first width; a first end portion having a second width different from the first width, wherein the first end portion connects to an end of the central portion and extends in a first direction at a first angle with respect to the central portion; and a second end portion having a third width different from the first width, wherein the second end portion connects to another end of the central portion and extends in a second direction at a second angle with respect to the central portion.

In a further aspect, which may be provided independently, there is provided a radio-frequency (RF) antenna comprising: a port configured to receive RF radiation; a meandered waveguide coupled to the port; and at least one slot formed from or coupled to the meandered waveguide, such that RF radiation received through the port passes through the meandered waveguide and is emitted through the at least one slot and/or RF radiation received through the at least one slot passes through the waveguide to the port. wherein the meandered waveguide comprises at least one L-shaped bend and a recess positioned adjacent to a corner of a first arm and second arm of the L-shaped bend, wherein the recess is parallel to or is a partial continuation of a first arm of the L-shaped bend, and wherein the antenna further comprises at least one parasitic element configured to preferentially direct radiation around the L-shaped bend instead of into the recess, thereby minimising radiation leakage into the recess.

The parasitic element may be substantially triangular in profile. The parasitic element may be positioned on an outer surface of the second arm of the L-shaped bend at the corner of the L-shaped bend.

The antenna may further comprise a complementary parasitic element positioned on an inner surface of the second arm of the L-shaped bend.

The antenna may further comprise a further L-shaped bend that combines with the second L-shaped bend to form a U-shape, and a further parasitic element associated with the second L-shaped bend.

The antenna may further comprise a moveable element. The recess may be configured to receive the moveable element. A surface of the moveable element may provide an outer surface of the first arm of the L-shaped bend. Movement of the moveable element may change a length of the waveguide.

The meandered waveguide may be a ridged waveguide. A size of a ridge of the ridged waveguide in at least one dimension may be the same as a size of the parasitic element in the at least one dimension. A size of a ridge of the ridged waveguide in at least one dimension may be similar to a size of the parasitic element in the at least one dimension. The parasitic element may thereby form a further ridge.

The waveguide may be a leaky-wave waveguide. The leaky-wave waveguide may be a meandered leaky-wave waveguide.

In a further aspect, there is provided a method comprising: receiving, by a port of an RF antenna, RF radiation; and emitting, by at least one slot formed from or coupled to a meandered waveguide of the RF antenna, RF radiation received through the port and passed through the meandered waveguide to the plurality of bent slots. The meandered waveguide comprises at least one L-shaped bend and a recess positioned adjacent to a corner of a first arm and second arm of the L-shaped bend, wherein the recess is parallel to or is a partial continuation of a first arm of the L-shaped bend, and wherein the antenna further comprises at least one parasitic element configured to preferentially direct radiation around the L-shaped bend instead of into the recess, thereby minimising radiation leakage into the recess.

In a further aspect, there is provided a method comprising receiving, by at least one slot of an RF antenna, RF radiation, wherein the at least one slot is formed from or coupled to a meandered waveguide of the RF antenna; and receiving, by a port of the RF antenna, RF radiation received by at least one slot and passed through the meandered waveguide to the port. The meandered waveguide comprises at least one L-shaped bend and a recess positioned adjacent to a corner of a first arm and second arm of the L-shaped bend, wherein the recess is parallel to or is a partial continuation of a first arm of the L-shaped bend, and wherein the antenna further comprises at least one parasitic element configured to preferentially direct radiation around the L-shaped bend instead of into the recess, thereby minimising radiation leakage into the recess.

In a further aspect, which may be provided independently, there is provided a radio-frequency (RF) antenna comprising a radiating element comprising a plurality n of D-shaped arms, each extending in a respective radial direction relative to a centre of the radiating element and substantially equally spaced around the centre, such that the radiating element is rotationally symmetric.

The radiating element may have a rotational symmetry of order n. n may be 3. n may be at least 3. n may be 4. n may be at least 4.

A shape of the radiating element may be a union of n overlapping D-shaped component shapes. Each of the D-shaped component shapes may be semi-circular. Each of the D-shaped component shapes may be semi-elliptical.

Each of the D-shaped component shapes may have a radius R. R may be between 0.1 and 10 mm. R may be between 0.9 and 2.8 mm. Each of the D-shaped component shapes may have an offset distance Cr by which a rotational point is offset from a centre of the D-shaped component shape. The centre may be a centre of a straight side of the D-shaped component shape. Cr may be between 10% and 90% of R.

The radiating element may be one of a linear array of radiating elements each having n D-shaped arms.

The antenna may further comprise a first port configured to receive RF radiation and a waveguide coupled to the first port, wherein each radiating element is formed from or coupled to the waveguide, such that RF radiation received through the first port passes through the waveguide and is emitted through the radiating elements and/or RF radiation received through the radiating elements passes through the waveguide to the first port.

The antenna may further comprise a second port, wherein the first port is coupled to a first end of the waveguide and the second port is coupled to a second end of the waveguide, such that RF radiation received through the first port is emitted through the radiating elements with a first circular polarisation, and RF radiation received through the second port is emitted through the radiating elements with a second, different circular polarisation.

The waveguide may be a metallic waveguide. The waveguide may be a ridged waveguide. The waveguide may be a leaky-wave waveguide. The waveguide may be a meandered leaky-wave waveguide.

The waveguide may be a substrate integrated waveguide.

The radiating element or radiating elements may be formed on a printed circuit board (PCB). The antenna may be a PCB leaky-wave antenna.

The RF radiation may have a characteristic frequency. The radiating elements may be arranged in a regular linear array having a fixed separation between radiating elements of less than a wavelength at the characteristic frequency.

The antenna may further comprise further regular linear arrays of radiating elements that combine with the regular linear array of radiating elements to form a regular two-dimensional array, wherein a first dimension of the array and a second, substantially perpendicular dimension of the array each have a fixed separation between radiating elements of less than a wavelength at the characteristic frequency.

The RF radiation may have a range of frequencies. The characteristic frequency may be a central frequency of the range of frequencies of the RF radiation.

The characteristic frequency may be between 1 GHz and 50 GHz. The characteristic frequency may be in Ku band. The characteristic frequency may be between 12 GHz and 18 GHz. The characteristic frequency may be in Ka band. The characteristic frequency may be between 26.5 GHz and 40 GHz.

The range of frequencies may be at least 100 MHz, optionally at least 200 MHz, further optionally at least 250 MHz, further optionally at least 300 MHz. The range of frequencies may be less than 1000 MHz, optionally less than 500 MHz, further optionally less than 300 MHz.

The antenna may comprise a first component part in which a first portion of each radiating element is formed, and a second component part in which a second portion of each radiating element is formed.

In a further aspect, there is provided a method comprising: receiving, by a port of an RF antenna, RF radiation and emitting, by a radiating element formed from or coupled to a waveguide of the RF antenna, RF radiation received through the port and passed through the waveguide to the radiating element, wherein the radiating element comprises a plurality n of D-shaped arms, each extending in a respective radial direction relative to a centre of the radiating element and substantially equally spaced around the centre, such that the radiating element is rotationally symmetric.

In a further aspect, there is provided a method comprising: receiving, by a radiating element of an RF antenna, RF radiation, wherein the radiating element is formed from or coupled to a waveguide of the RF antenna; and receiving, by a port of the RF antenna, RF radiation received by the radiating element and passed through the waveguide to the port; wherein the radiating element comprises a plurality n of D-shaped arms, each extending in a respective radial direction relative to a centre of the radiating element and substantially equally spaced around the centre, such that the radiating element is rotationally symmetric.

Features in one aspect may be provided as features in any other aspect as appropriate. Any feature or features in one aspect may be provided in combination with any suitable feature or features in any other aspect.

BRIEF DESCRIPTION OF THE DRAWINGS

Various aspects of the invention will now be described by way of example only, and with reference to the accompanying drawings, of which.

DETAILED DESCRIPTION

Figure 2A:
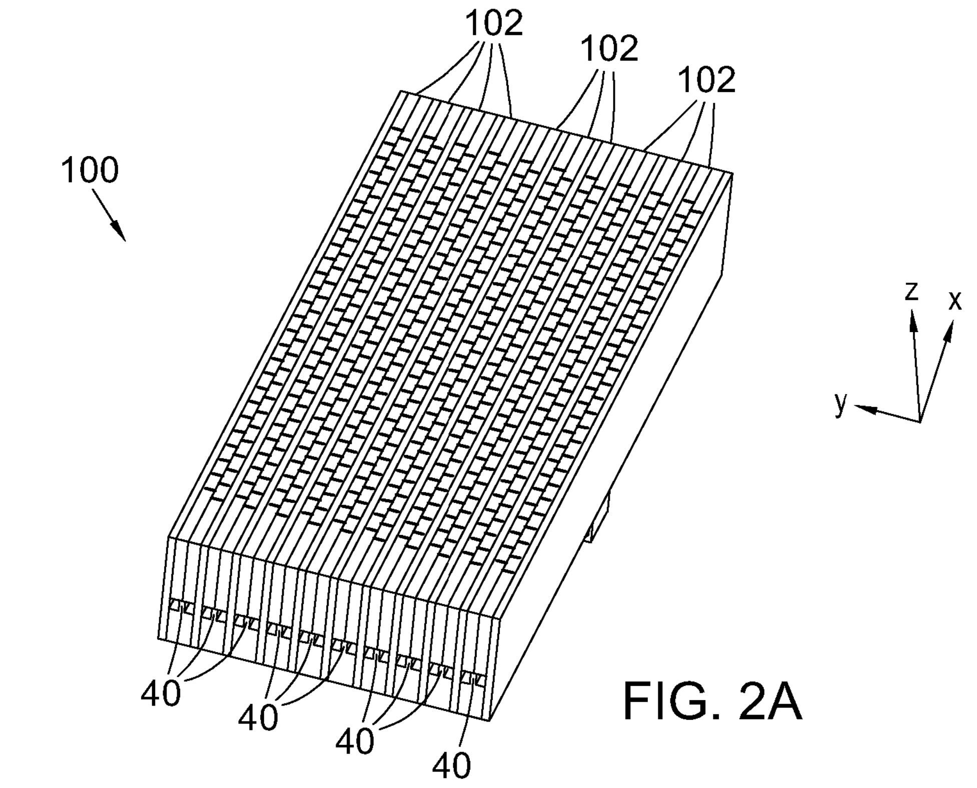
FIG. 2A is a schematic illustration of a meandered leaky-wave antenna in accordance with an embodiment.
Figure 2B:
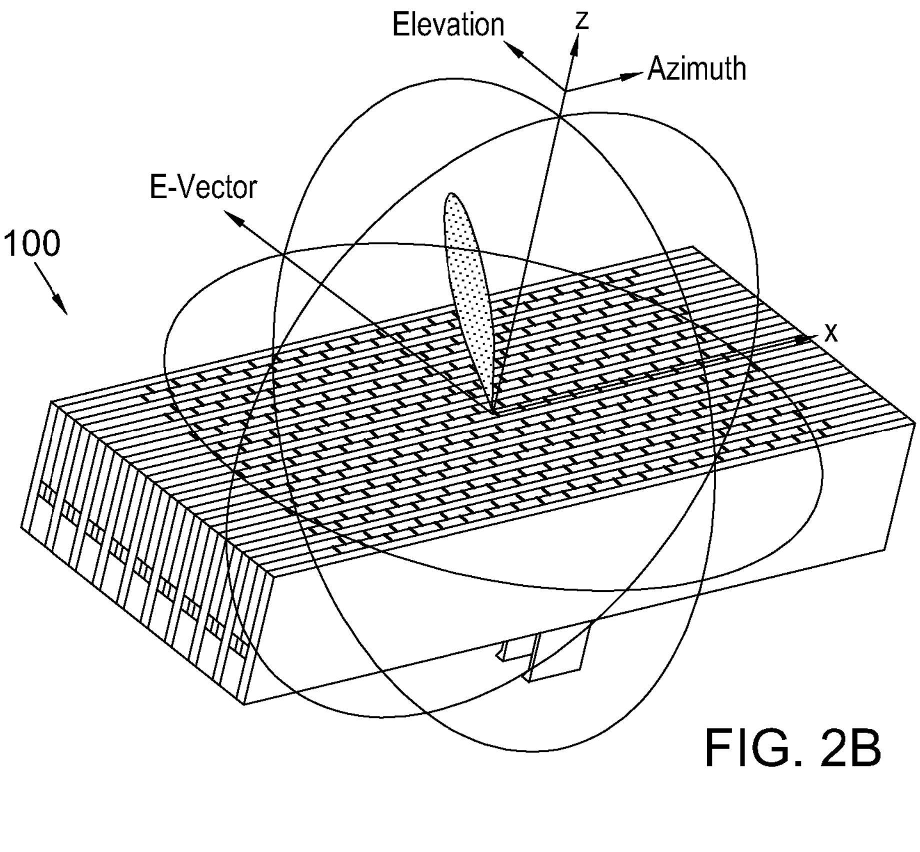
FIG. 2B is a schematic illustration showing a further view of the antenna of FIG. 2A.

FIGS. 2A and 2B are schematic illustrations of a meandered leaky-wave antenna 100 in accordance with an embodiment. The antenna 100 is a radio-frequency antenna configured for fixed-frequency operation. In practice, fixed-frequency operation may mean operation over a fixed, narrow band around a central frequency. In the present embodiment, the antenna 100 is configured to operate in Ku band (12 to 18 GHz). In other embodiments, the antenna is configured to operate in Ka band (26.5 to 40 GHz). In further embodiments, the antenna 100 may be configured to operate at any suitable frequencies.

The antenna 100 is a 2D antenna which may be considered to comprise a plurality of linear meandered leaky-wave antennas 102, each fed via a respective port 40. Each of the linear antennas 100 is configured to steer a beam in azimuth (which here is in the x-z plane) using a mechanical movement similar to that described above with reference to FIGS. 1A and 1B. In other embodiments, any suitable method may be use to steer the beam in azimuth. For example, any suitable components may be moved to change a waveguide length.

The antenna 100 further comprises a plurality of phase shifters (not shown) which are configured to adjust relative phases of the linear antennas 102, thereby to steer the beam in elevation (which here is in the y-z plane). Each of the phase shifters controls a phase of radiation input to a corresponding one of the linear antennas 102.

Each of the linear antennas 102 comprises a plurality of bent slots 90 which are described in detail below with reference to FIGS. 3E and 3H.

A slot spacing in x is selected to avoid grating lobes. For example, a slot spacing of 0.66 wavelengths may be selected for operation with a scanning range of 65 degrees from broadside. A slot spacing in y (and therefore, a height of each linear antenna 102 in y) is selected to avoid grating lobes. In the present embodiment, a spacing between slots is 15 mm.

In use in a transmission mode, radiation is input to port 40 and propagates though meandered waveguides in the interior of each of the linear antennas 102. At least part of the input radiation is radiated through bent slots 90. A beam of the antenna 100 may be steered in x by changing a mechanical length of the waveguides using a mechanical mechanism as described above, thereby changing a relative phase between the slots 90 of each linear antenna. A beam of the antenna 100 may be steered in y by using the phase shifters to change relative phases between the linear antennas 102.

In use in a receiving mode, radiation is received through bent slots 90. A mechanical length of the waveguides may be adjusted to change a relative phase between the slots of each linear antenna, to change an azimuth angle from which the radiation is received. Phases of the phase shifters may be adjusted to change a relative phase between the linear antennas, to change an elevation angle from which the radiation is received. Radiation received at slots 90 propagates through the waveguide to port 40. The received radiation may then be processed and analysed.

FIG. 2B shows the antenna 100 marked up with directions of x and z axes, an E vector along the y axis, and azimuth and elevation planes.

Figure 2C:
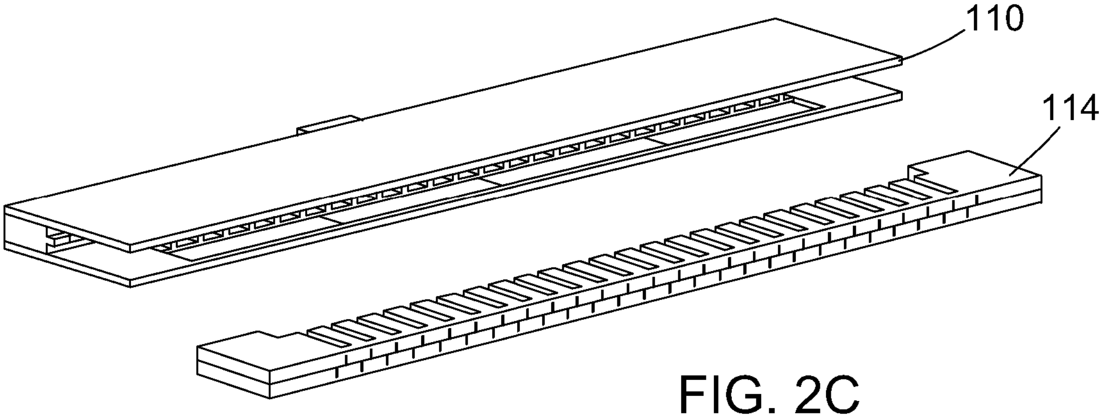
FIG. 2C is a schematic illustration of components of the antenna of FIG. 2A.

FIG. 2C is a schematic illustration of components 110, 114 of the antenna 100. The components 110, 114 of FIG. 2C form a 1D dynamic leaky-wave antenna ready for integration into the 2D antenna system 100. Each of the components 110, 114 is metallic or has a metallic coating or plating. Component 110 comprises at least part of an outer housing of antenna 100. Component 114 comprises the slots 90 of antenna 100 and at least part of a wall in which the slots are formed.

In an embodiment, a ground terminal comprises two two-dimensional antennas 100. Both antennas are reconfigurable meandered leaky waveguide. Both antennas 100 are configured for use in Ku band. A first antenna 100, for use in receiving (Rx), is configured to operate over a 250 MHz bandwidth centred at 11.6 GHz. A second antenna 100, for use in transmitting (Tx), is configured to operate over a 250 MHz bandwidth centred at 14.4 GHz.

In another embodiment, a ground terminal comprises two two-dimensional antennas 100 for use in Ka band. An Rx antenna is configured to operate over a bandwidth of 250 MHz or more, centred around 19 GHz. A Tx antenna is configured to operate over a bandwidth of 250 MHz or more, centred around 29 GHz.

In other embodiments, antenna 100 may be configured for use at any suitable radio frequency. A terminal may comprise any suitable number of reconfigurable meandered leaky-wave antennas 100.

Antenna 100 as shown in FIGS. 2A and 2B differs in several ways from the antenna 2 described above with reference to FIGS. 1A and 1B. Firstly, antenna 100 comprises a ridged waveguide as described below with reference to FIGS. 3C to 3E. Secondly, antenna 100 comprises a bent ridged slot 90 as described below with reference to FIGS. 4E and 4H, which allows a height of the waveguide in y to be reduced. Thirdly, parasitic elements as described below with reference to FIGS. 5B and 6C are used to direct radiation within the waveguide. Fourthly, each linear antenna 102 may be formed from two component parts as described below with reference to FIGS. 3F and 7.

In other embodiments, any selection from or combination of the ridged waveguide, bent ridged slot, parasitic elements may be used. For example, an antenna of one embodiment may have a ridged waveguide and bent ridged slots without including the parasitic elements. An antenna of another embodiment may use the parasitic elements but not the ridged waveguide and/or bent ridged slots. In further embodiments, a ridged waveguide and/or bent ridged slots and/or parasitic elements may be used in any suitable waveguide antenna, for example any suitable leaky-wave antenna, which may not resemble the waveguide antenna 2 of FIGS. 1A and 1B. In other embodiments, any suitable antenna configuration may be formed in two parts as described below with reference to FIGS. 3F and 7.

Figure 3A:
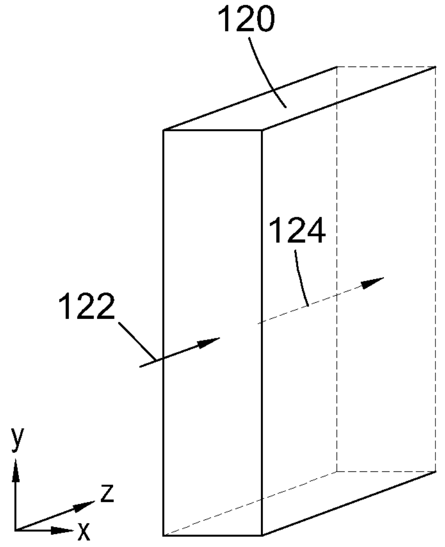
FIG. 3A is a schematic illustration of a waveguide cross-section.

FIG. 3A illustrates a portion of a waveguide 120, for example a waveguide similar to the waveguide 4 of antenna 2. The waveguide 120 has a rectangular cross-section in an x-y plane. Dimensions of the waveguide cross-section are such that the waveguide 120 has a cut-off frequency $F_c$ of 9.5 GHz. Radiation having a wavelength below the cut-off frequency F of 9.5 GHz will be unable to propagate in waveguide 120.

An arrow 122 represents radiation that is input to the waveguide 120. In the example of FIG. 3A, the input radiation has a frequency $F_0$ of 13 GHz. The input frequency $F_0$ is greater than the cut-off frequency $F_c$, so propagation is allowed. Arrow 124 represents radiation propagating within the waveguide 120.

Figure 3B:
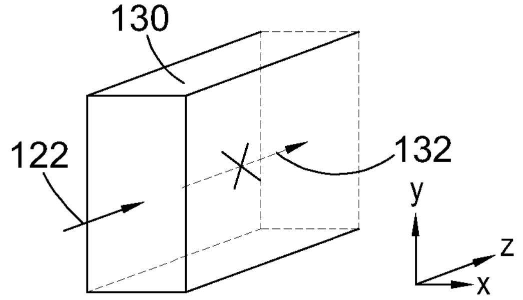
FIG. 3B is a schematic illustration of a further waveguide cross-section.
Figure 3C:
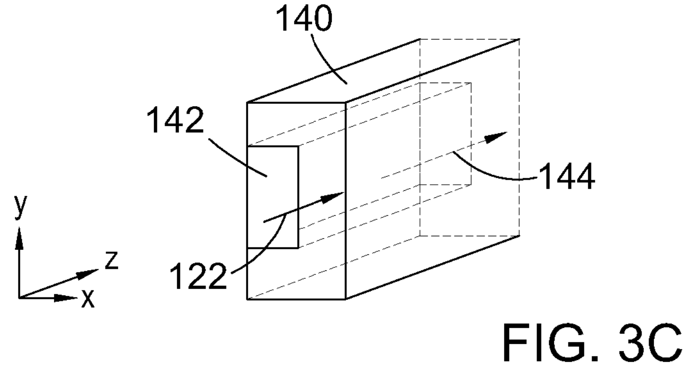
FIG. 3C is a schematic illustration of a ridged waveguide cross-section in accordance with an embodiment.

FIG. 3B illustrates a portion of a further waveguide 130. FIGS. 3B and 3C are each drawn to the same scale as FIG. 3A.

The further waveguide 130 of FIG. 3B is reduced in size in y to be more compact than the waveguide 120 of FIG. 3A. The reduction in size leads to the cut-off frequency $F_c$ increasing to 21 GHz. Arrow 122 represents input radiation having a frequency $F_0$ of 13 GHz. Since the input frequency $F_0$ is less than the cut-off frequency $F_c$, propagation is not allowed. The crossed arrow 132 represents the non-propagation of the input radiation in the further waveguide 130.

FIG. 3C illustrates a ridged waveguide 140. It may be considered that the ridged waveguide 140 is formed by positioning a ridge 142 on one wall of a waveguide having dimensions similar to waveguide 140 of FIG. 3B. The ridge 142 is an element having a rectangular cross section. The ridge 142 occurs on a central portion of one of the walls that is parallel to the y axis, and protrudes into the waveguide by a proportion of the x dimension of the waveguide, such that the resulting ridged waveguide 140 has a C-shaped cross section. A size of the ridge in y is a proportion of the size of the waveguide in y. For example, in some embodiments, the size of the ridge in y may be one third or one half of the size of the waveguide in y.

The ridge 142 changes the cut-off frequency $F_c$ of the waveguide 140. In the example shown in FIG. 3C, the cut-off frequency $F_c$ of the ridged waveguide 140 is 10.2 GHz. Arrow 122 represents input radiation having a frequency $F_0$ of 13 GHz. Since the input frequency $F_0$ is greater than the cut-off frequency $F_c$, propagation is allowed. Arrow 144 represents propagation of radiation within the ridged waveguide 140.

The antenna 100 of the embodiment shown in FIGS. 2A and 2B comprises a ridged waveguide 140 as shown in FIG. 3C. By using a ridged waveguide 140, the waveguide of antenna 100 is made more compact to further reduce grating lobes.

Figure 3D:
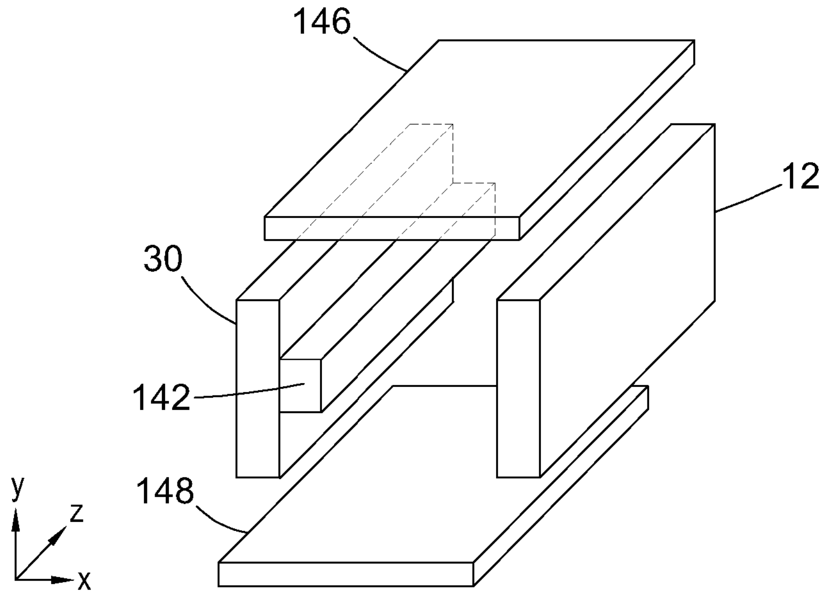
FIG. 3D is an exploded view of a section of ridged waveguide in accordance with an embodiment.

FIG. 3D shows an exploded view of a section of the waveguide 140 of the antenna 100. The ridge 142 is positioned on one of the elongate dividing elements 30 to form a ridged side wall. Opposite the ridged side wall is a flat wall that is formed of one of the first moveable elements 12. The other walls of the waveguide are part of a third wall 146 of the antenna 100 and part of a fourth wall 148 of the antenna 100. The ridge is centred relative to the third wall 146 and fourth wall 148. FIG. 3E shows a non-exploded view of the section of waveguide 140 that is shown in FIG. 3D.

The waveguide is made more compact by introducing conducting ridges along walls of the waveguide as described above with reference to FIGS. 3C to 3E and as discussed further below with reference to FIGS. 5B, 6C and 6F. The ridges modify a cross-section of the waveguide. By modifying the cross-section of the waveguide, the ridges also modify a resonant frequency of the waveguide. A reduction of the overall waveguide height in y, when compared with waveguide 120 of FIG. 3A, is used to maintain an initial cut-off frequency of the waveguide to be substantially the same cut-off frequency as before the ridges were added.

Figure 4A:
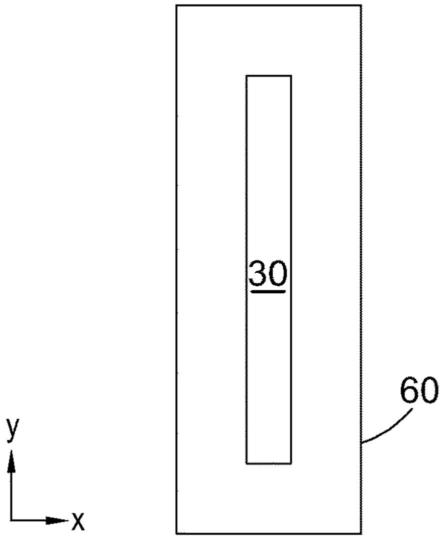
FIG. 4A is a schematic illustration of a linear slot.

FIGS. 4A to 4H illustrate different designs of radiating slots. FIG. 4A shows a plan view of a linear slot 30 similar to that used in the antenna 2 of FIGS. 1A and 1B. The linear slot 30 extends parallel to the y axis of the coordinate system of the antenna, and has a width in the x axis. The linear slot 30 also has a thickness in the z direction which is not shown in FIG. 4A, but is described below with reference to FIG. 4G.

Figure 1A:
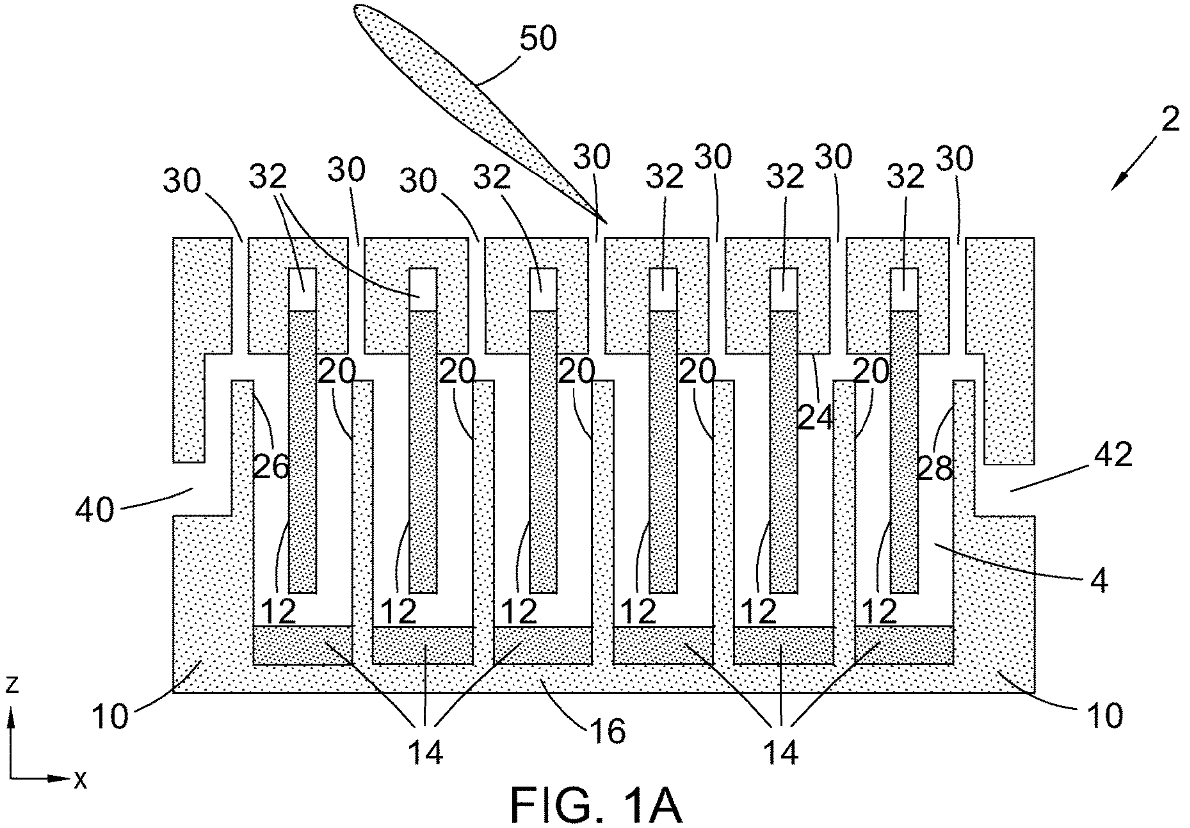
FIG. 1A is a schematic illustration of a meandered leaky-wave antenna in which moveable elements occupy a first position.
Figure 1B:
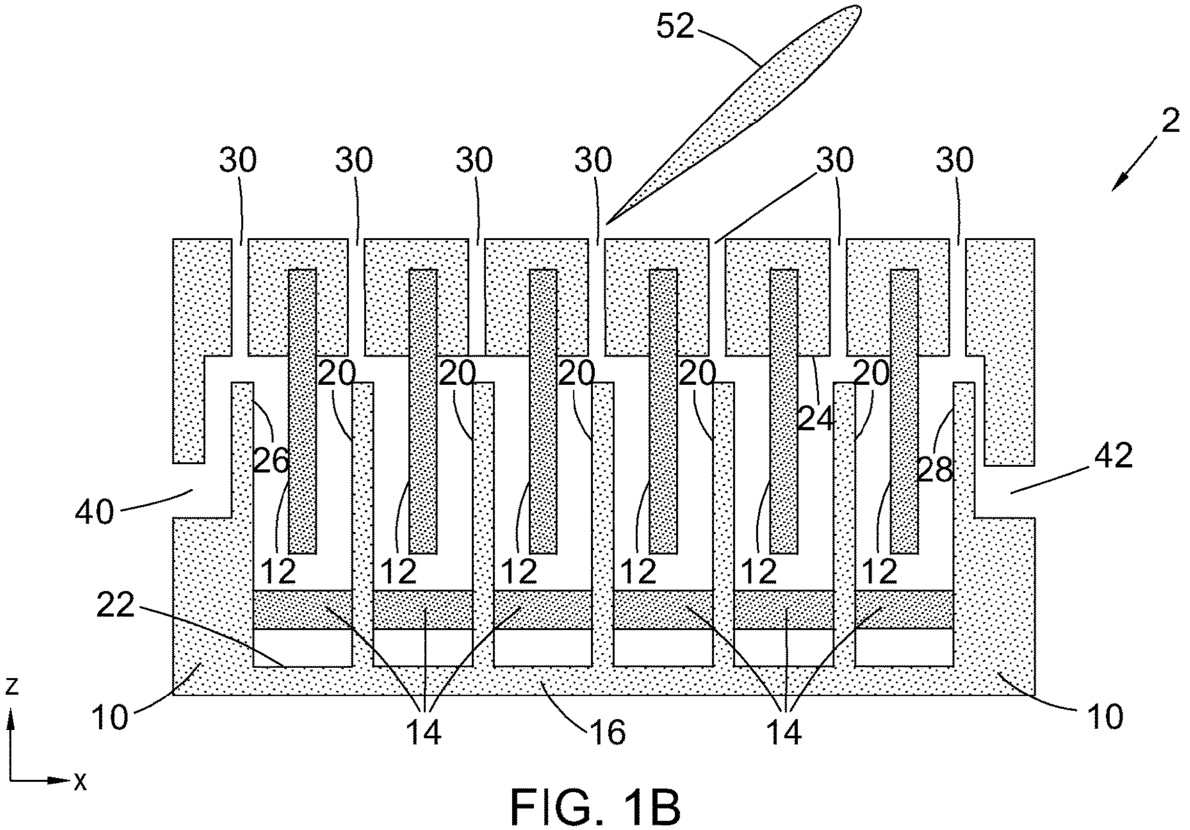
FIG. 1B is a schematic illustration of the meandered leaky-wave antenna of FIG. 1A, in which the moveable elements occupy a second, different position.

The linear slot 30 is formed within a portion 60 of the second wall 24 of an antenna 2 similar to that shown in FIGS. 1A and 1B. The portion 30 has a surface area in x and y as shown in FIG. 4A.

Figure 4B:
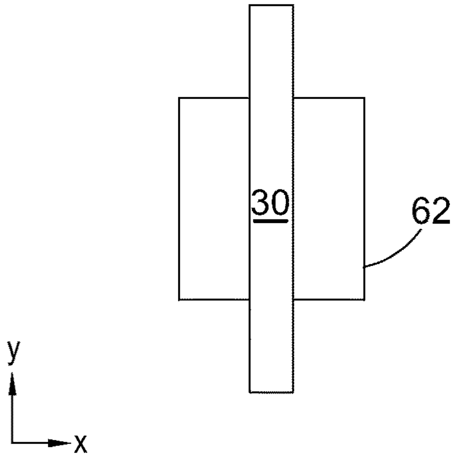
FIG. 4B is a schematic illustration of the linear slot of FIG. 4A superimposed on an allocated surface area.

In some circumstances, it is desirable to reduce the size of a radiating element, for example a slot, to fit within an allocated surface area in x and y dimensions. FIG. 4B shows the linear slot 30 superimposed on an example of an allocated surface area 62, which is smaller than the surface area 60 shown in FIG. 4A.

Inter-element spacings of the radiating elements in a 2D array may be determined such that the 2D array operates below a limiting grating lobes condition. By choosing an appropriate spacing in x, grating lobes may be eliminated when steering a beam produced by the 2D array in azimuth. By choosing an appropriate spacing in y, grating lobes may be eliminated when steering the beam produced by the 2D array in elevation. A surface area 62 allocated to each radiating element of the 2D array may be such as to implement the determined inter-element spacings.

In FIG. 4B, a length in x of the allocated surface area 62 is shorter than a length in x of the portion 60 shown in FIG. 4A, and is also shorter than the length in x of the linear slot 30. The linear slot 30 does not fit on the allocated surface area 62 of the radiating part of the antenna.

Figure 4C:
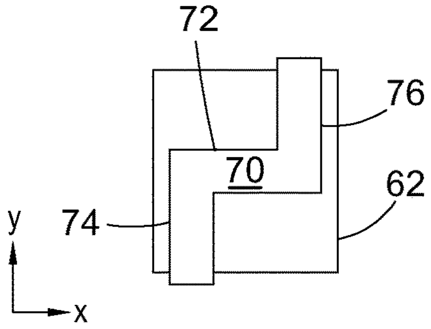
FIG. 4C is a schematic illustration of a bent slot.
Figure 4D:
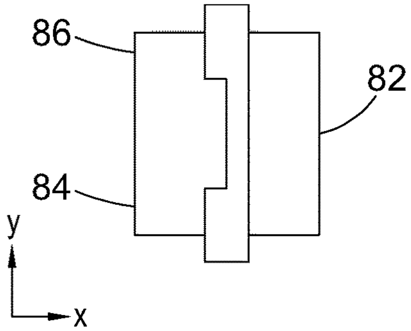
FIG. 4D is a schematic illustration of a ridged slot.
Figure 4E:
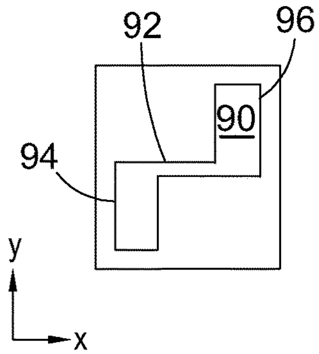
FIG. 4E is a schematic illustration of a bent ridged slot in accordance with an embodiment.

FIGS. 4C to 4E show different slots 70, 80, 90 that are designed to have similar radiating performance to the slot 30 of FIGS. 4A and 4B (for example, to radiate similar frequencies) but have reduced length in the x dimension.

FIG. 4C shows a bent slot 70. The bent slot 70 has the same slot length as slot 30 when measured along the slot itself, but is bent to reduce its overall length in y. Two right angle bends are introduced into the slot, so that the bent slot 70 has a Z shape. A central portion 72 of the bent slot is rotated such that it lies parallel to the x axis (and perpendicular to the length of the original linear slot 30). Two end portions 74, 76 of the bent slot lie parallel to the y axis, and parallel to the length of the original linear slot 30. End portion 74 extends downwards in y from a first end of the central portion 72. End portion 76 extends upwards in y from a second end of the central portion 72.

When considering overall dimensions of the bent slot 70 compared to the linear slot 30, the bent slot 70 is wider in x but shorter in y, since its central section is turned around by 90 degrees. In the example shown, the bent slot 70 is not short enough to fit within the allocated surface area 62.

FIG. 4D is a schematic illustration of a ridged slot 80 that is designed to radiate at a similar frequency to the linear slot 30. The ridged slot 80 is a linear slot lying parallel to the y axis and comprising three portions 82, 84, 86. A central portion 82 of the ridged slot 80 is narrower than two end portions 84, 86 of the ridged slot 80. The end portions 84, 86 have the same slot width as the linear slot 30. By reducing the width of the central portion 82 of the ridged slot 80 compared with the end portions 84, 86, the length of the ridged slot 80 in y is reduced when compared with the linear slot 30. However, the ridged slot 80 is not short enough to fit within the allocated surface area 62.

FIG. 4E is a schematic illustration of a bent ridged slot 90. The bent ridged slot 90 is a Z shaped slot in which a central portion 92 is rotated by 90 degrees relative to two end portions 94, 96. The central portion 92 is parallel to the x axis. End portion 94 extends downwards in x from a first end of the central portion 92. End portion 96 extends upwards in x from a second end of the central portion 92. In the bent ridged slot 90 of FIG. 4E, the central portion 92 has a narrower slot width than each of the end portions 94, 96. The bent ridged slot 90 may be considered to have been formed by adding a Z-shaped bend to the ridged slot 80 of FIG. 4D.

In the present embodiment, a length of the central portion 92 is 5.75 mm. A width of the central portion 92 is 0.8 mm. Each of the end portions 94, 96 has a length of 4.16 mm and a width of 1.4 mm. In other embodiments, any suitable dimensions may be used.

By including both the Z-shaped bend and the ridged portion, the bent ridged slot 90 fits into the allocated surface area 62. The bent ridged slot 90 may have similar performance to the original linear slot 30.

The antenna 100 of the embodiment shown in FIGS. 2A and 2B comprises a plurality of bent ridged slots 90 as shown in FIG. 4E. In other embodiments, any suitable bent slot or bent ridged slot may be used as a radiating element. In further embodiments, any radiating element having a suitable size and configured to radiate a suitable frequency of radiation may be used.

A redesign of the radiating element from a linear slot 30 to a bent ridged slot 90 allows a reduction in overall height in y. In the antenna 100 of FIGS. 2A and 2B, the radiating element 90 is used in combination with the ridged waveguide 140, and lies on one of the waveguide walls. The bent ridged slot 90 is designed in such a way that an electric length of the radiating element is still the same as the linear slot 30, thus substantially maintaining a cut-off frequency of each slot. However, the overall y dimension of the slot is reduced. The transverse electric modes, carrying the energy, propagating along the waveguide are coupled to the new slots in a controlled manner and radiation occurs.

Table 1 is a list of widths for bent ridged slots having a Z shape similar to that shown in FIG. 4E. The bent ridged slots are of fixed length, where a length L1 of the central portion is 5.75 mm and a length L2 of the end portions is 4.2 mm. A column with the heading Width portion 1 shows a width of the central portion. A column with the heading Width portion 2 shows a width of the end portions. A column with the heading Leakage rate shows a leakage rate for each set of widths. It may be seen that leakage increases with slot width.

TABLE 1

| Length (constant) | Width portion 1 (mm) | Width portion 2 (mm) | Leakage rate |
|---|---|---|---|
| L1 = 5.75 mm | 0.3 | 0.5 | 0.0011 |
| L2 = 4.2 mm | 0.35 | 0.55 | 0.00115 |
| | 0.4 | 0.6 | 0.0012 |
| | 0.45 | 0.65 | 0.0015 |
| | 0.5 | 0.7 | 0.0018 |
| | 0.55 | 0.8 | 0.0022 |
| | 0.6 | 0.85 | 0.0029 |
| | 0.65 | 0.95 | 0.0036 |
| | 0.7 | 1.1 | 0.0047 |
| | 0.75 | 1.25 | 0.0062 |
| | 0.8 | 1.4 | 0.0082 |
| | 0.85 | 1.8 | 0.0131 |

Figure 4F:
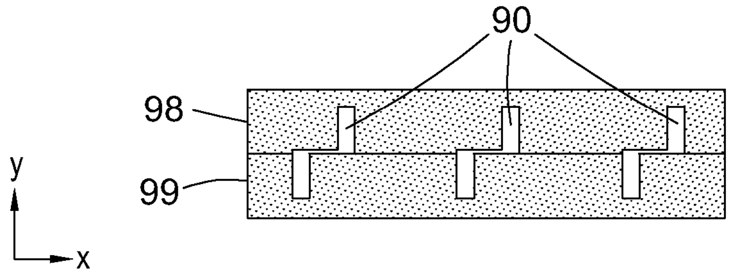
FIG. 4F is a schematic illustration of a bent ridged slot in accordance with an embodiment, where the bent ridged slot is formed in two parts.

FIG. 4F shows an array of bent ridged slots 90, where the bent ridged slots 90 are formed by combining a first component part 98 with a second component part 99. The first component part 98 and second component part 99 are both metallic. The first component part 98 has a plurality of cut-outs, each comprising end portion 96 and central portion 92 of a respective bent ridged slot 90. The second component part 99 has a corresponding plurality of cut-outs, each comprising end portion 94 of a respective bent ridged slot 90. The first component part 98 and second component part 99 are joined to form the full bent ridged slot 90. Component part 114 as shown in FIG. 2C may comprise the first component part 98 and second component part 99 that together form the slots 90.

Forming the slots in two component parts may provide advantages in manufacturing. In some circumstances, it may be difficult to manufacture a small radiating element. In particular, a long thin slot may be difficult to manufacture. Dividing an element into two pieces may make the element easier to manufacture. Time and cost to manufacture may be reduced. In some circumstances, the tolerances required in manufacture may not be as demanding if the radiating element is formed from two pieces as described above with reference to FIG. 4F.

Figure 4G:
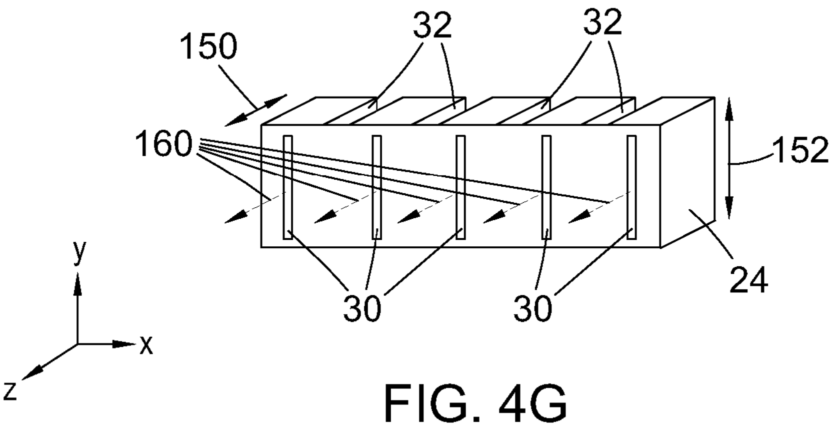
FIG. 4G is a schematic illustration of an array of linear slots.

FIG. 4G is a schematic illustration showing an isometric view of an array of linear slots 30 similar to those shown in FIG. 4A. A wall 24 in which the slots 30 are formed has a thickness 150 in the z direction. The thickness 150 in z is greater than half a wavelength at a frequency of operation. The wall 24 has a length 152 in y which is longer than a length of the linear slots 30.

Recesses 32 in the wall 24 are also illustrated in FIG. 4G.

In the example shown in FIG. 4G, a cut-off frequency $F_{cs}$ of each slot 30 is 10.2 GHz. If radiation having an input frequency $F_0$ of 13 GHz is input to each slot 30, propagation of the radiation is allowed as shown by arrows 160.

Figure 4H:
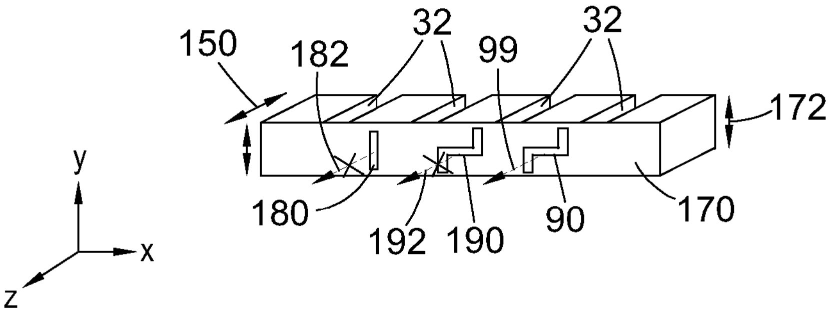
FIG. 4H is a schematic illustration of slots having reduced length, including the bent ridged slot of FIG. 4E.

FIG. 4H is a schematic illustration of a plurality of different slots 180, 190, 90 having a reduced length to fit within a wall 170 having a reduced height 172 in y. The wall 170 has the same thickness in z as the wall 24 of FIG. 4G.

Slot 170 is a linear slot having a shorter length than linear slot 30. Linear slot 170 has a cut-off frequency $F_{cs}$ of 29 GHz. Crossed arrow 172 is used to illustrate that propagation is not allowed for radiation having an input frequency $F_0$ of 13 GHz, because the input frequency $F_0$ is less than the cut-off frequency $F_{cs}$.

Slot 180 is a bent slot having a similar overall length in x to linear slot 170. Bent slot 180 has a cut-off frequency $F_{cs}$ of 16.8 GHz. Crossed arrow 182 is used to illustrate that propagation is not allowed for radiation having an input frequency $F_0$ of 13 GHz, because the input frequency $F_0$ is less than the cut-off frequency $F_{cs}$.

Figure 3E:
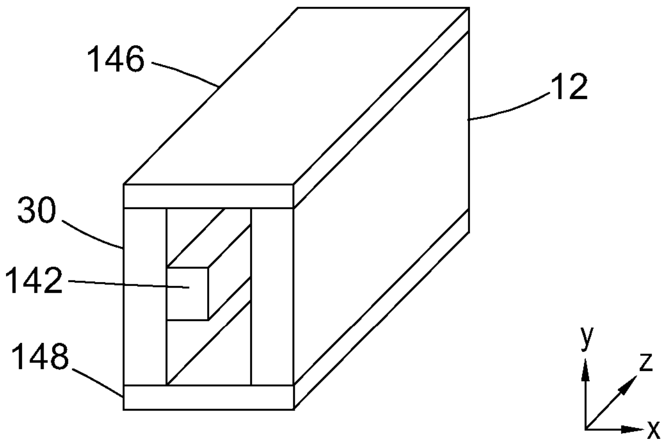
FIG. 3E is a non-exploded view of the section of ridged waveguide as shown in FIG. 3D.

Slot 90 is the bent ridged slot of FIG. 3E. Bent ridged slot 90 has a cut-off frequency of 10.3 GHz. Arrow 99 is used to illustrate that propagation is allowed for radiation having an input frequency $F_0$ of 13 GHz, because the input frequency $F_0$ is greater than the cut-off frequency $F_{cs}$. Slot 90 fits within the x dimension 172 of the wall 170.

Given the dimensions of the lateral wall where the slots are cut, each slot may be considered to act as an individual waveguide and therefore the cut-off frequency of each slot may need to be maintained below the operating frequency. By reducing the size of the slots, the cut-off frequency increases. In order to compensate this change and fit the slots within the allocated space, the slot 90 has been ridged and bent to a Z shape, with two vertical portions 94, 96 and one horizontal portion 92, as shown in FIGS. 4E, 4F and 4H.

Some proposed linear leaky wave antennas may not be suitable to be incorporated on a 2D system due to large lateral dimensions of the waveguide (above grating lobe conditions). Large lateral dimensions may prevent an antenna from scanning in both elevation and azimuth as required in Satellite On The Move systems. By reducing the lateral dimensions using a ridged waveguide and ridged slot, antenna 100 is capable of scanning in both azimuth and elevation.

Figure 8A:
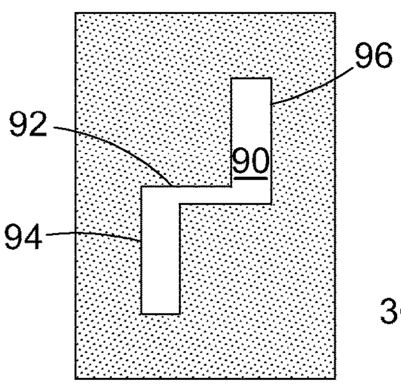
FIG. 8A is a schematic illustration of a Z-shaped slot in accordance with an embodiment.

In further embodiments, different shapes of ridged slot may be used. A ridged slot may be any slot in which different portions of the slot have different widths. Some examples of ridged slots are shown in FIGS. 8A, 8B, 8C and 8D. Each of the ridged slots of FIGS. 8A, 8B, 8C and 8D comprises a central portion and at least two end portions. FIG. 8A shows the bent ridged slot 90 having central portion 92 and end portions 94, 96. The bent ridged slot 90 is Z-shaped. The end portions 94, 96 connect to the central portion 92 at right angles, and extend away from the central portion 92 in opposing directions. In other embodiments, there may be any suitable angles between the central portion 92 and the first end portion 94, and between the central portion 92 and the second end portion 96.

In some manufacturing methods, for example CNC (Computer Numerical Control) machining, it may be easier to manufacture a slot having a right angle than to manufacture a slot having an angle that is not a right angle. However, with other manufacturing methods such as die casting, any angles may be used. In some circumstances, an angle in a slot may be selected in dependence on a manufacturing method to be used to manufacture the slot. Any suitable manufacturing method may be used, for example CNC, die casting or wire erosion.

Figure 8B:
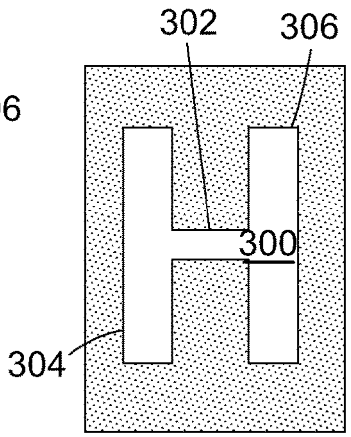
FIG. 8B is a schematic illustration of an H-shaped slot in accordance with an embodiment.
Figure 8C:
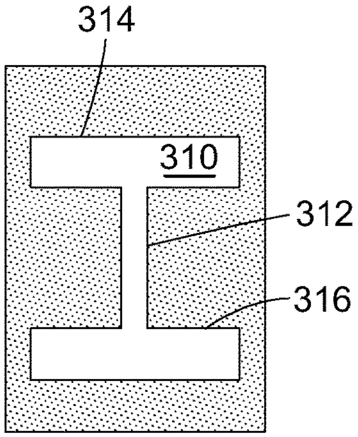
FIG. 8C is a schematic illustration of an I-shaped slot in accordance with an embodiment.

FIG. 8B shows an H-shaped slot 300 comprising a central portion 302 and two end portions 304, 306. The first end portion 304 is connected to a first end of the central portion 302 and extends both upwards and downwards relative to the central portion 302. The second end portion 306 is connected to a second end of the central portion 302 and extends both upwards and downwards relative to the central portion 302. The end portions 304, 306 have the same width. The central portion 302 is narrower than the end portions 304, 306. The end portions 304, 306 are longer than the central portion 302.

FIG. 8B shows a further slot 310 which may be described as a reverse H-shaped slot or as an I-shaped slot. Slot 310 comprises a central portion 312 and two end portions 314, 316. The central portion 312 is oriented vertically. The first end portion 314 is connected to a first end of the central portion 312 and extends both left and right relative to the central portion 312. The second end portion 316 is connected to a second end of the central portion 312 and extends both left and right relative to the central portion 312. The end portions 314, 316 have the same width. The central portion 312 is narrower than the end portions 314, 316.

In some circumstances the H-shaped slot 300 and the I-shaped slot 310 may have higher leakage than the Z-shaped slot 90.

Figure 8D:
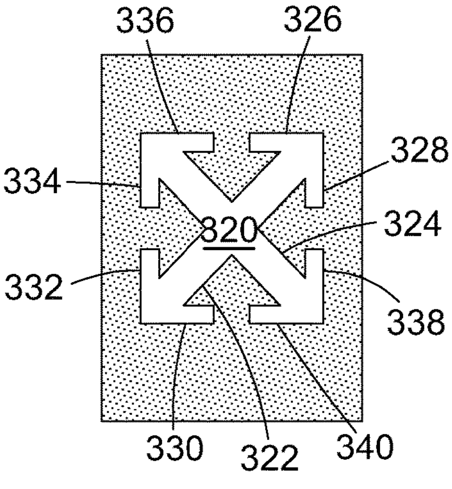
FIG. 8D is a schematic illustration of an X-shaped slot in accordance with an embodiment.

FIG. 8D shows an X-shaped slot 320. The X-shaped slot is configured to provide circularly polarised radiation. This differs from the Z-shaped slot 90, H-shaped slot 300 and I-shaped slot 310, which are each configured to provide linearly polarised radiation.

The X-shaped slot 320 comprises a first central portion 322 and a second central portion 324. The first central portion 322 and the second central portion 324 cross each other to form an X. A plurality of end portions 326, 328, 330, 332, 334, 336, 338, 340 are arranged such that each end of each central portion 322, 324 is terminated by a respective pair of end portions arranged in the shape of an arrow. For example, end portions 326, 328 are arranged at acute angles to a first end of first central portion 322 to form an arrow. The first central portion 322 and the second central portion 324 have the same width. The end portions 326, 328, 330, 332, 334, 336, 338, 340 have a narrower width than the central portions 322, 324.

In other embodiments, any suitable slot may be used in which an end portion forms an angle with a central portion, and the end portion and the central portion differ in width.

A further feature of antenna 100 is integration of parasitic components 200 next to the slots 90. In the present embodiments, each of the parasitic components 200 may be considered to form a ridge, or part of a ridge, since the parasitic components 200 are positioned centrally with regarding to a y dimension of the waveguide as described further below.

The parasitic components 200 may help to reduce losses along the cavity by allowing the transverse modes to propagate within the waveguide in a well-defined direction.

Figure 5A:
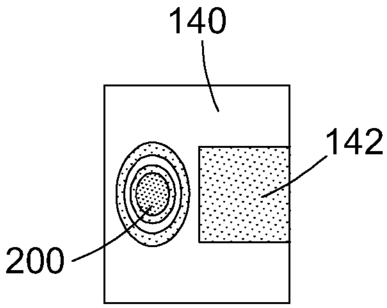
FIG. 5A is a schematic illustration of a ridged waveguide in cross-section.
Figure 5B:
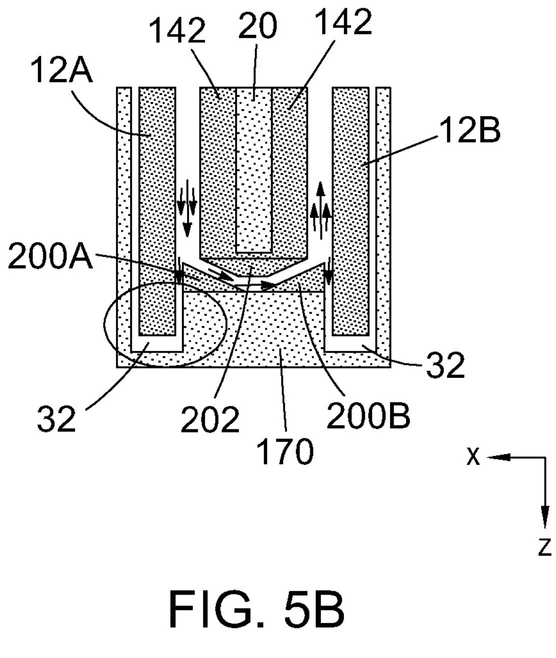
FIG. 5B is a schematic illustration showing a cross-section of a unit element of a meandered waveguide in accordance with an embodiment, in which parasitic elements are used to guide radiation.

Taking the ridge waveguide as a starting point, almost all the transverse electric mode is contained in the lowest impedance region (i.e. by the ridge). FIG. 5A shows a cross section of a ridged waveguide 140 comprising a ridge 142. A region 200 of propagation of the transverse electric mode is shown in FIG. 5A.

A parasitic element is introduced within the meander waveguide to guide the propagation of the electric field so the energy is guided to pass through a pre-defined path and thus avoiding leakage in the waveguide region of the slot (i.e. avoiding energy loss). The parasitic element may have dimensions and positioning in y that are the same as the dimensions and positioning in y of the ridge 142. For example, the ridge 142 and the parasitic element may each be positioned centrally in the waveguide with respect to the y axis. A size of the ridge in y may be the same as a size of the ridge in. In some embodiments, the size of the ridge in y and the size of the parasitic element in y may each be one third or one half of a size of the waveguide in y.

FIG. 5B is a schematic illustration of part of a meandered waveguide (which in FIG. 5B is shown without a slot 90). FIG. 5B shows two recesses 32A, 32B in a wall 170. Each of the recesses 32A, 32B is configured to accept a respective first moveable element 12A, 12B. The first moveable elements 12A, 12B are positioned on opposing sides of an elongate dividing element 20. The elongate dividing element comprises ridge 142 to form a ridged waveguide. The ridge 142 extends along the left side of the elongate dividing element 20, along the end of the elongate dividing element 20, and along the right side of the elongate dividing element 20.

A pair of parasitic elements 200A, 200B having triangular cross section in x-z are positioned on the wall 170. Parasitic element 200A is positioned beside recess 32A and acts to guide radiation away from recess 32A. Parasitic element 200B is positioned beside recess 32B and acts to guide radiation away from recess 32B. Arrows show a path of radiation around the elongate dividing element 20.

A section 202 of the ridge 142 is positioned on the end of the elongate dividing element 20. The section 202 of the ridge 142 has tapered corners to allow the parasitic elements 200A, 200B to fit within the waveguide. The tapered section 202 of the ridge 142 also forms part of a parasitic system in which it acts in combination with the parasitic elements 200A, 200B to guide radiation around the end of the elongate dividing element 20. The further element 202 has a left corner that is cut off at an angle corresponding to an angle of a surface of parasitic 200A, and a right corner that is cut off at an angle corresponding to an angle of a surface of parasitic 200B, thereby forming a waveguide of consistent width.

The tapered corners of section 202 of ridge 142 and the two parasitic components 200A, 200B may be considered together to form a double ridge U shaped waveguide section as described below with reference to FIG. 6G.

Figure 6A:
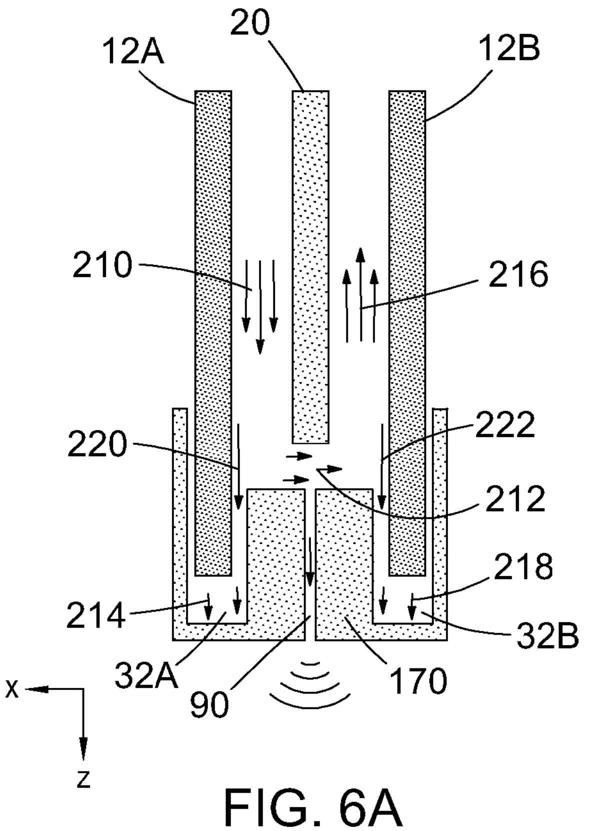
FIG. 6A is a schematic illustration showing a cross-section of a unit element of a meandered waveguide.

FIG. 6A shows a waveguide portion corresponding to the waveguide portion of FIG. 5B, but without the presence of the ridge 142 and parasitic elements 200A, 200B, 202. FIG. 6A is a view from the top of a meander using a standard rectangular waveguide cross-section as shown in FIG. 3A.

Two recesses 32A, 32B are configured to accept respective first moveable elements 12A, 12B are positioned on opposing sides of elongate dividing element 20.

Arrows 210, 212, 214, 216, 218 represent paths taken by radiation propagating within the waveguide portion. Starting at the top left of FIG. 6A, arrow 210 shows radiation propagating in a z direction between first moveable element 12A and the elongate dividing element 20. The radiating element arrives at a corner at which the waveguide starts to turn around a right-angled corner 220 to pass between the end of the elongate dividing element 20 and the wall 170. The right-angled corner 220 may be considered to be an L-shaped corner in which a first arm of the L is between the first moveable element 12A and the elongate dividing element 20, and a second arm of the L is between the end of the elongate dividing element 20 and the wall 170.

Most of the radiation turns the L shaped corner 220. However, since the recess 32A is also positioned by that corner, some of the radiation leaks into the recess 32A as shown by arrows 214. Leakage of radiation into the recess 32A may lead to losses. Leakage of radiation into the recess 32A may mean that the radiation does not maintain its correct phase when propagating through the waveguide, since radiation returning from the recess 32A is likely to be out of phase with radiation that has not entered the recess 32A.

Part of the radiation is emitted through slot 90. The remaining radiation continues within the waveguide as shown by arrows 212.

The waveguide then turns a further right angle (L shaped) corner 222 to pass between the elongate dividing element 20 and first moveable element 12B. In all, the waveguide follows a U shaped bend around the end of the elongate dividing element 20.

Most of the radiation turns the further L shaped corner 222 and continues within the waveguide as shown by arrows 216. Some radiation leaks into the recess 32B which is positioned by the further L shaped corner. The radiation leaking into the recess 32B is shown by arrows 218. Leakage into the recess 32B may also cause radiation to be combined out of phase.

Figure 6B:
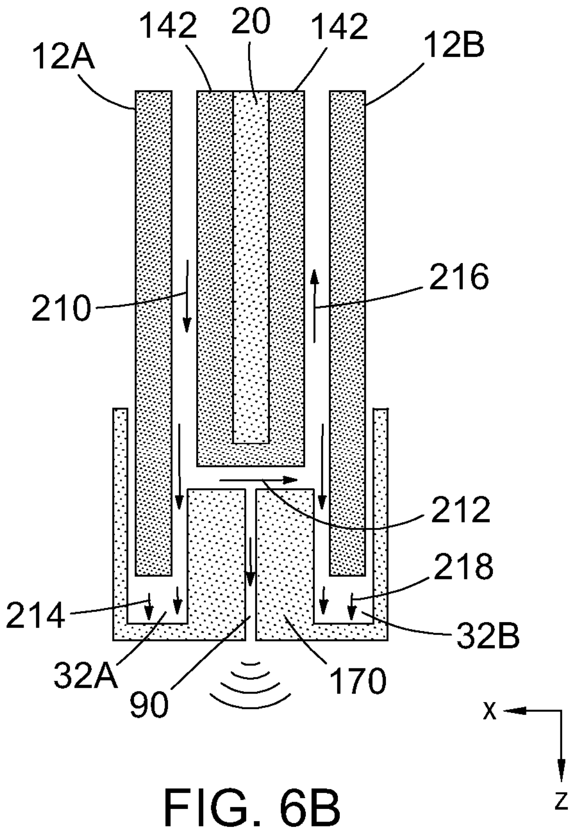
FIG. 6B is a schematic illustration showing a cross-section of a unit element of a meandered ridged waveguide.
Figure 6C:
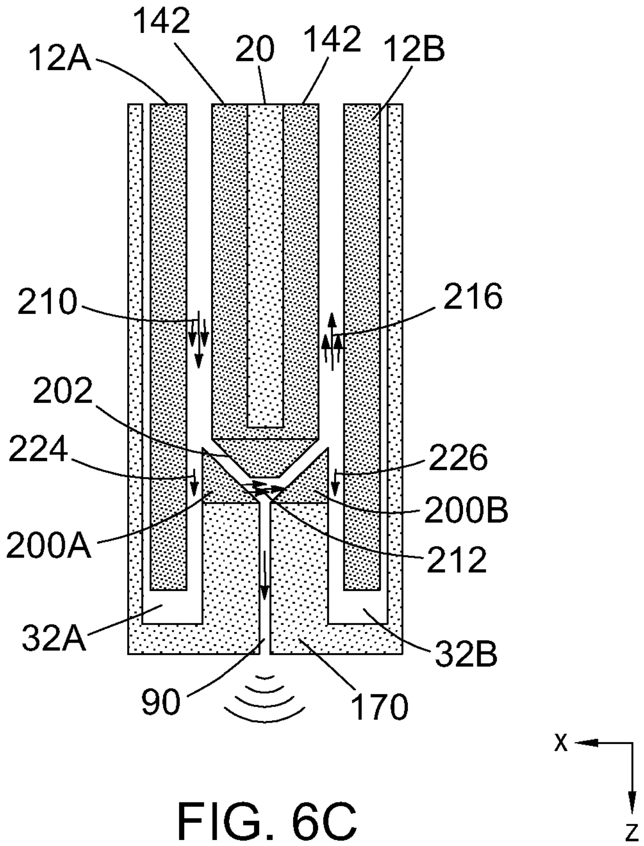
FIG. 6C is a schematic illustration showing a cross-section of a unit element of a meandered waveguide in accordance with an embodiment, in which parasitic elements are used to guide radiation.

FIG. 6B shows the addition of ridge 142 around the elongate dividing element 20. FIG. 6B is a view from the top of a meander using a ridged waveguide as shown in FIG. 3C. Some radiation continues to leak into recesses 32A, 32B as shown by arrows 214, 218.

FIG. 6C shows the same configuration as FIG. 5B, but with the slot 90 also illustrated. Parasitics 200A and 200B and tapered section 202 of ridge 142 are positioned to guide radiation around the U-shaped bend at the end of elongate dividing element 20, thereby reducing leakage of radiation into recesses 32A, 32B. The reduced leakage of radiation is shown by smaller arrows 224, 226.

Figure 6D:
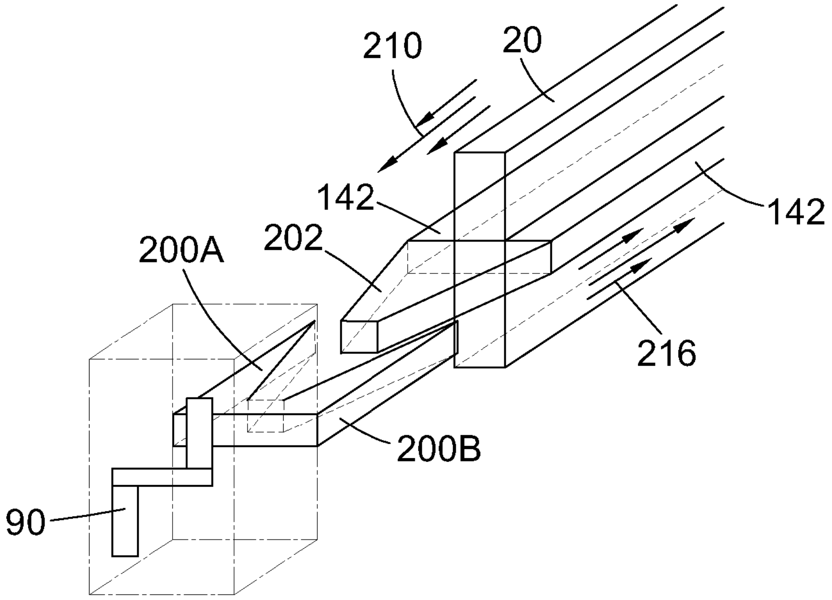
FIG. 6D is an isometric view of the unit element of FIG. 6C.

FIG. 6D is an isometric view of the configuration of FIGS. 6C and 5B.

Figures 6E, 6F, 6G:
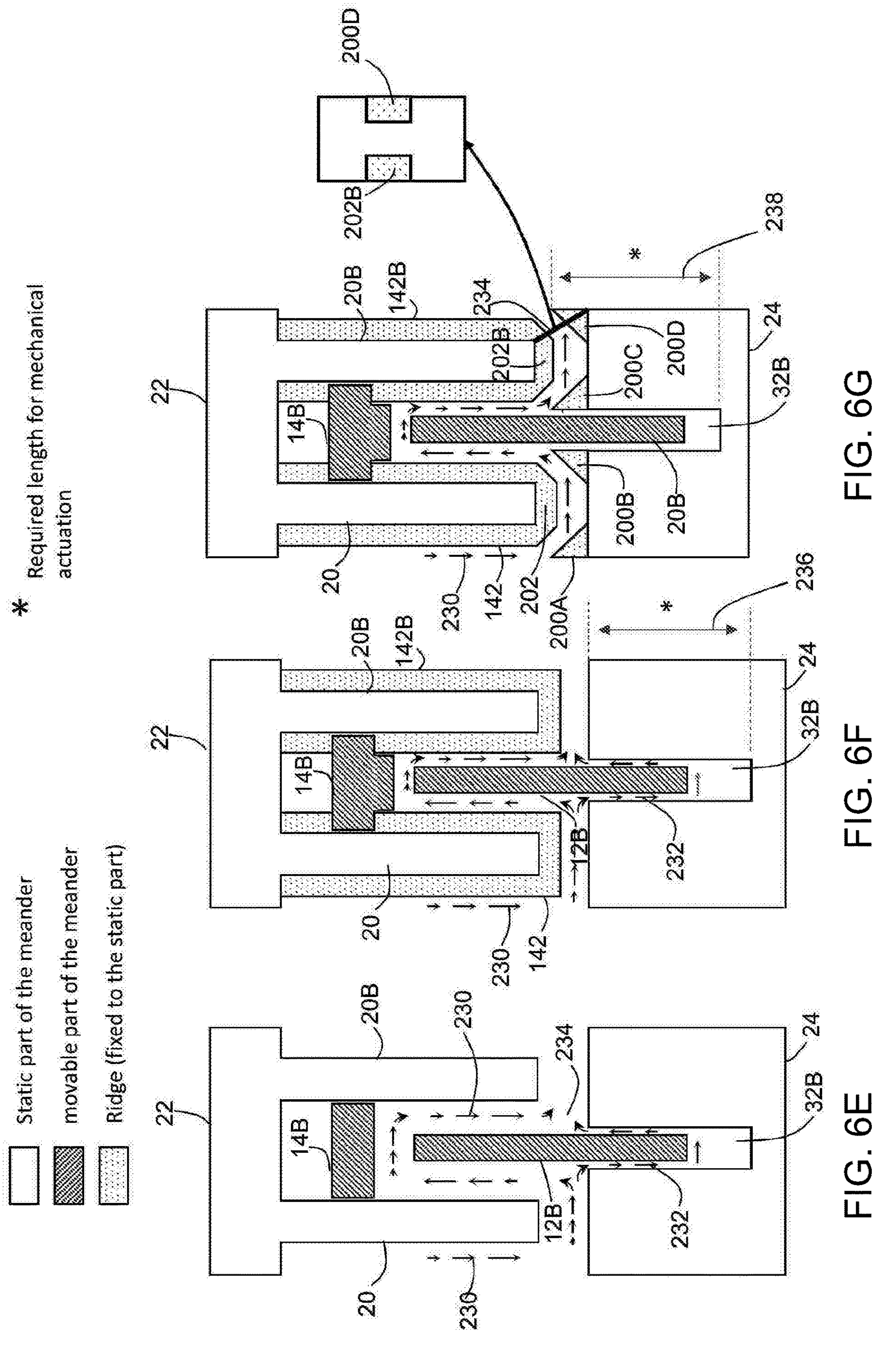
FIG. 6E is a schematic illustration showing a further cross-section of a unit element of the meandered waveguide of FIG. 6A.
FIG. 6F is a schematic illustration showing a further cross-section of a unit element of the meandered ridged waveguide of FIG. 6B.
FIG. 6G is a schematic illustration showing a further cross-section of a unit element of the meandered ridged waveguide of FIG. 6F.

FIGS. 6E, 6F and 6G provide alternative views of the meandered waveguides of FIGS. 6A, 6B and 6C respectively. FIGS. 6E, 6F and 6G focus on the path of radiation around the first moveable element 12B, and also show corresponding second moveable element 14B.

In FIG. 6E, a further elongate dividing element 20B is shown in addition to elongate dividing element 20. First moveable element 12B and second moveable element 14B are positioned between elongate dividing element 20 and elongate dividing element 20B.

Elongate dividing elements 20, 20B, first wall 22 and second wall 24 form a static part of the meandered waveguide. First moveable element 12B and second moveable element 14B form a moveable part of the meandered waveguide. Ridges 142, 144 are fixed to the static part. The static part, moveable part and ridges are distinguished in FIGS. 6E to 6G by differences in shading.

Most of the radiation in the waveguide follows the waveguide to proceed between elongate dividing element 20 and first moveable element 12B; between an end of first moveable element 12B and second moveable element 14B; and between first moveable element 20 and elongate dividing element 20B, as shown by arrows 230. However, some radiation leaks into recess 32B as shown by arrows 232. Two waves (shown by arrows 230 and arrows 232) combine out of phase at corner 234.

In FIG. 6F, a ridge 142 is added to elongate dividing element 20 and a ridge 142B is added to elongate dividing element 20B. A shape of second moveable element 14B is also adjusted to continue the ridged waveguide. Again, most of the radiation follows the waveguide as indicated by arrows 230 and some leaks into recess 32B as shown by arrows 232. Two waves (shown by arrows 230 and arrows 232) combine out of phase at corner 234.

An arrow 236 in FIG. 6F that is identified by an asterisk shows a required length of movement for mechanical actuation of first moveable element 20B. The movement extends from the top of recess 32B to the bottom of recess 32B.

In FIG. 6G, parasitics 200A, 200B are added opposite the end of elongate dividing element 20 and similar parasitics 2000, 200D are added opposite the end of elongate dividing element 20B. A section 202 of ridge 142 and a section 202B of ridge 142B are tapered in the x-z plane to accommodate the parasitics. A cross-section of the waveguide at line 236 is also shown in FIG. 6G. It may be seen that tapered section 202 of ridge 142 and parasitic 200D together form a section of double ridged waveguide at the part of the corner that is cut by line 236. Parasitic 200D forms a further ridge that is occupies a central portion of a y dimension of the waveguide. A size of the parasitic element 200D in y is the same as a size of the ridge 142 in y, as can be seen from the cross section showing section 202B of the ridge 142. The parasitic element 200D and the ridge 142 are each positioned centrally in the waveguide with respect to the y axis.

An arrow 238 shows a required length of movement for mechanical actuation of first moveable element 20B in antenna 100. The movement extends from the top of the parasitics 200A, 200B, 2000, 200D to the bottom of recess 32B. A required depth of recess 32B is therefore reduced. An overall z dimension of the antenna 100 is reduced by use of the parasitic elements. The parasitic elements allow a height of the antenna in z to be reduced, making the overall antenna 100 smaller and flatter.

In some known systems, leakage between two different metallic parts may be reduced using high accuracy in manufacture to minimize a size of a recess or cavity 32. Requiring high accuracy may be expensive.

In some known systems, leakage between two different metallic parts may be reduced by adding additional material, for example Teflon or a ceramic, to coat the recesses or cavities 32. Such an approach may be expensive. The additional material may experience wear and tear in use.

In any case in which two different components are brought into physical contact with each other, degradation of the material may be generated due to the mechanical movement.

Using parasitic elements to guide the radiation instead of using very accurate tolerances and/or an additional coating may provide a cost-effective method of reducing leakage.

In other embodiments, one or more parasitic elements having a triangular cross section as described above may be used to guide radiation around any suitable L-shaped or U-shaped corner, or around a corner having any suitable angle. The parasitic element or elements may be used to divert radiation away from any suitable recess or cavity.

In further embodiments, the parasitic elements may have any suitable dimensions. A size of the parasitic elements in y may differ from a size of the ridge in y. In some embodiments, the waveguide is not ridged. In some such embodiments, a size of the parasitics in y may be such as to extend across the whole extent of the waveguide in y.

Figure 7:
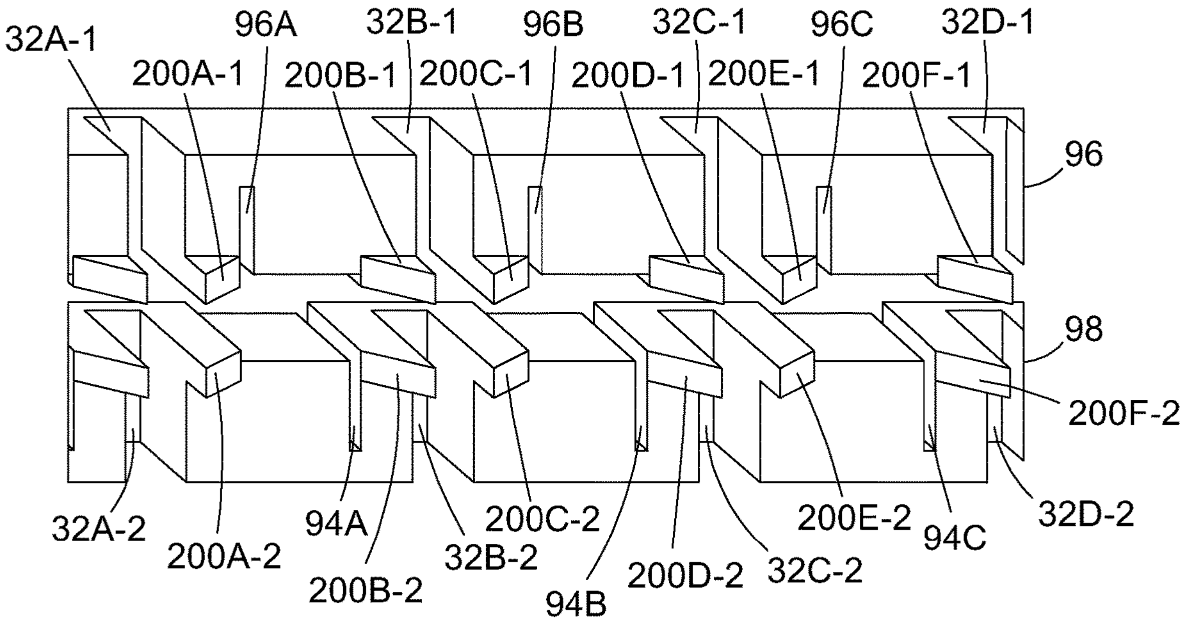
FIG. 7 is a schematic illustration of a plurality of bent ridged slots and parasitic elements, formed in two parts.

FIG. 7 shows an inner surface of a first component part 98 and second component part 99 that together form wall 170. As illustrated in FIG. 3E, a plurality of bent slots 90 each comprise a first end portion 96 that is cut into first component part 98, and a second end portion 94 that is cut into second component part 99. In other embodiments, parts of radiating elements may be formed in any suitable manner in first component part 98 and second component part 99.

A first bent slot comprises a first end portion 96A and a second end portion 94A. A second bent slot comprises a first end portion 96B and a second end portion 94B. A third bent slot comprises a first end portion 96C and a second end portion 94C.

Recesses 32 are also shown in FIG. 7. Each recess 32 is formed from a first part that is cut into first component part 98 and the second part that is cut into second component part 99. For example, a first recess is formed from a first part 32A-1 and a second part 32A-2. A second recess is formed from a first part 32B-1 and a second part 32B-2. A third recess is formed from a first part 32C-1 and a second part 32C-2. A fourth recess is formed from a first part 32D-1 and a second part 32D-2.

FIG. 7 also shows a plurality of parasitic elements 200. Each parasitic element 200 is formed from a first part that is part of first component part 98, and the second part that is part of second component part 99. For example, parasitic element 200A is formed from a first part 200A-1 and a second part 200A-2. Parasitic element 200B is formed from a first part 200B-1 and a second part 200B-2. Similarly, parasitic elements 2000 to 200F are each formed from a respective first part 200C-1 to 200F-1 and a respective second part 200C-2 to 200F-2.

The features described above with reference to antenna 100 may provide a waveguide that is suitable for a 2D antenna that provides beam steering, at a fixed beam frequency, at a lower cost and/or complexity and/or improves a scanning range, as well as providing a solution that is easily scalable to other frequency ranges.

Cost may be reduced by the use of waveguide technology and use of a mechanical system that allows wave propagation in free-space and beam scanning without drawing upon fancy dispersive materials. Expensive electronic components (for example, phase shifters) may be reduced by performing beam scanning in azimuth using the mechanical reconfiguration system.

Antenna 100 is a linear leaky-wave antenna that allows integration in a 2D array system and thus provides beam steering capability from the backward to the forward quadrant at a fixed frequency in both azimuth and elevation planes.

Miniaturisation of the antenna has been performed by means of a ridge structure that allows a lateral miniaturisation and thus integration within a 2D array below a limiting grating lobes condition (i.e. eliminating grating lobes). The radiating element is also modified to allow miniaturisation and to ease a manufacturing process.

A parasitic element is added to the structure in order to avoid any unwanted leakage within the metallic gaps (recesses 32) of the radiating element which incorporate the mechanical means to modify the length of the meander lines.

Antenna 100 may provide a high performance electrically steerable flat panel antenna (FPA) solution to enable global, fast and reliable mobile connectivity services on remote areas or when travelling e.g. by plane, ship, train, buses or personal vehicle. The FPA may be used within a ground terminal that transmits and receives data from a satellite when the ground terminal is mounted on a moving platform (e.g. plane, ship, train, buses or personal vehicle). The antenna may falls within the category of so-called FPAs providing low-profile, 7 cm in height, and 60 cm lateral dimension for the required gain.

The antenna may offer superior tracking performance and improved reliability over traditional systems. The antenna may require only a fraction of the radio frequency (RF) components in some known systems, which may significantly reduce the cost of the antenna. For example, the use of mechanical steering in one dimension may reduce a number of phase shifters used.

The antenna design may provide high performance at a low cost. An exceptional size, weight, and power footprint may be provided. More reliable electronic tracking may be provided for low earth orbit (LEO), medium earth orbit (MEO) and geosynchronous or geostationary earth orbit (GEO) satellite constellations.

High-speed connectivity may be provided in trains, cars, buses, and/or planes. Logistic operations in remote areas may be better managed and safely controlled.

Returning to the bent ridged slot 90, as described above FIG. 8A shows a Z-shaped bent ridged slot 90 having central portion 92 and end portions 94, 96. The end portions 94, 96 are arranged at right angles to the central portion 92. The end portions 94, 96 are of the same length.

Figure 8E:
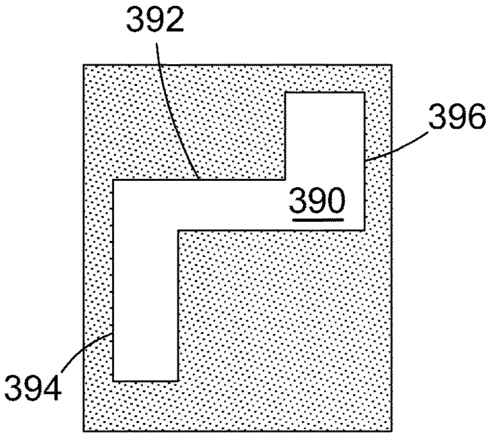
FIG. 8E is a schematic illustration of a further Z-shaped slot in accordance with an embodiment.

FIG. 8E shows a Z-shaped bent ridged slot 390 in accordance with a further embodiment. End portions 394, 396 of the Z-shaped slot 390 connect to a central portion 392 at right angles, and extend away from the central portion 392 in opposing directions. In the embodiment of FIG. 8E, one end portion 396 is shorter than the other end portion 394. In other embodiments, any suitable relative lengths of the end portions 394, 396 and central portion 392 may be used.

Although FIGS. 8A to 8E illustrate antennas having particular dimensions, in other embodiments dimensions of each portion may be adjusted while keeping a similar overall shape (for example, Z-shaped, H-shaped, I-shaped or X-shaped). For example, end portions may have different lengths. End portions may have different widths, while keeping the widths of the end portions wider than the width of the central portion or portions.

Any of the antenna types illustrated in FIGS. 8A to 8E may be used in a linear meandered leaky-wave antenna 100 as described above with reference to FIG. 2A, or in any suitable waveguide antenna.

In some embodiments, bent slots having a shape in accordance with any of the embodiments described above may be formed on a printed circuit board (PCB). The bent slots may be formed as slots in a metal layer of a PCB. The PCB may further comprise a dielectric substrate and a ground plane. In such embodiments, the antenna may be a PCB leaky wave antenna. The antenna may comprise a substrate integrated waveguide. The substrate integrated waveguide comprising an upper metal layer in which a plurality of bent slots are formed, a substrate, and a ground plane layer. Vias may be used to emulate a waveguide wall as described below in relation to FIGS. 23A to 24.

Figure 9:
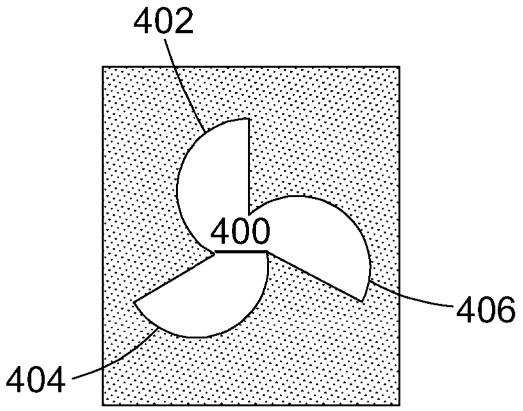
FIG. 9 is a schematic illustration of a radiating element in accordance with an embodiment.

FIG. 9 illustrates a radiating element 400 in accordance with a further embodiment. In FIG. 9, the radiating element 400 is a slot element. The radiating element 400 may be formed within a metal wall of a waveguide, for example a waveguide of an antenna 100 as described above with reference to FIG. 2A. A plurality of radiating elements 400 may be used to form a linear array, or a plurality of linear arrays.

The radiating element 400 comprises three arms 402, 404, 406. The three arms 402, 404, 406 are each D-shaped and extend radially from a central position, such that the radiating element 400 has a rotational symmetry of order 3. The shape of the radiating element is discussed further below with reference to FIGS. 10A and 10B.

In an embodiment, a plurality of radiating elements 400 are substituted for the Z-shaped slots in antenna 100 of FIG. 2A. In use, RF radiation is transmitted or received by the radiating elements 400 in a manner similar to that described above with reference to antenna 100. Radiation input to a port may pass through a meandered waveguide and by emitted by radiating elements 400. Radiation received at radiating elements 400 may pass through the meandered waveguide to the port. In other embodiments, radiating elements 400 may be used in any suitable waveguide having any suitable port or ports.

Radiating element 400 may provide a compact radiating slot for radiating circularly polarised radiation. Radiating element 400 may provide improved axial ratio when compared with other slot elements, for example when compared with an X-shaped slot, which is configured to provide circular polarisation.

Radiating element 400 may also be referred to as a helictical slot. Radiating element 400 may provide a miniaturized radiating slot for a leaky wave antenna (metallic waveguide or PCB) that provides right-hand circular polarised (RHCP) radiation and/or left-hand circular polarised (LHCP) radiation with superior RF performance.

Figure 10A:
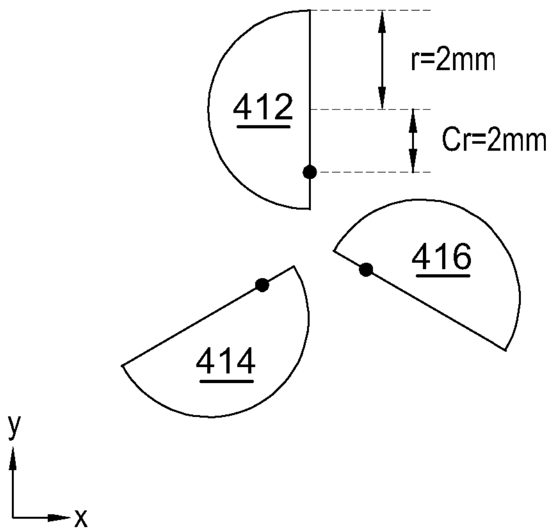
FIG. 10A is a schematic illustration of D-shaped component parts of a shape of a radiating element.
Figure 10B:
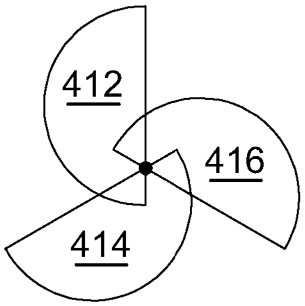
FIG. 10B is a schematic illustration of a combination of D-shaped components parts to form the shape of the radiating element of FIG. 9.

FIGS. 10A and 10B illustrate schematically how a set of D-shaped component shapes are arranged to form the shape of a radiating element 400 having D-shaped arms 402, 404, 406. FIG. 10A shows three D-shaped component parts 412, 414, 416. The D-shaped component parts 412, 414, 416 are geometric shapes which are combined to obtain the overall shape of radiating element 400. The D-shaped component parts 412, 414 and 416 are shown separately in FIG. 10A for clarity, and are then shown in combination in FIG. 10B.

Each D-shaped component part 412, 414, 416 has a first side that is a straight side and a second side that is a curved side. In the present embodiment, each D-shaped component part 412, 414, 416 is semi-circular. In other embodiments, each D-shaped component part 412, 414, 416 may be a semi-ellipse, semi-oval or other similar shape.

In further embodiments, the first side of the D-shaped component part may be slightly curved, such that the first side has a curvature that is lower than the curvature of the second side.

For each D-shaped component part 412, 414, 416, the straight side may be considered to be aligned with a respective radial line (not shown in FIG. 10A) extending from a central point (not shown in FIG. 10A) such that the D-shaped component parts are circumferentially spaced by equal angles around the central point (not shown in FIG. 10A). X and Y axes are shown in FIG. 10A. The straight side of component part 412 is aligned with the Y axis. The straight side of component part 414 is 120 degrees anticlockwise from the Y axis. The straight side of component part 416 is 240 degrees anticlockwise from the Y axis.

In the embodiment illustrated in FIG. 10A, each D-shaped part component part 412, 414, 416 is a semicircle of radius R, where R=2 mm. In other embodiments, R may have any suitable value. For example, R may be between 0.9 mm and 2.8 mm. R may depend on a frequency or range of frequencies for which the radiating element 400 is to be used. In further embodiments, the D-shaped parts may be semi-elliptical instead of semi-circular.

A respective rotational point is defined on each component part 412, 414, 416. Each rotational point is illustrated by a bold dot in FIG. 10A. The rotational point is a point on the straight side of the component part that is offset by distance Cr from the centre of the straight side, in a radially inwards direction. In the embodiment shown in FIG. 10A, Cr=1.2 mm. In other embodiments, any suitable value for Cr may be used. For example, Cr may be between 10% of R and 90% of R. A leakage rate for the antenna may be tuned by adjusting parameters R and Cr. The leakage may be increased by increasing R and/or increasing C. The leakage may be decreased by decreasing R and/or decreasing C.

FIG. 10B shows the component parts 412, 414, 416 when they are brought together to form the combined shape shown in FIG. 9. Compared to the arrangement shown in FIG. 10A, the component parts 412, 414, 416 are moved radially inwards such that the rotational points defined on the different component parts 412, 414, 416 all coincide with each other and with the central point (shown by a bold dot in FIG. 10B). The component parts 412, 414, 416 partially overlap. The shape of the radiating element 400 as shown in FIG. 9 is the union of the shapes of the component parts 412, 414, 416 shown in FIG. 10B. The D-shaped component parts 412, 414, 416 result in the D-shaped arms 402, 404, 406 of the radiating element 400.

Figure 11A:
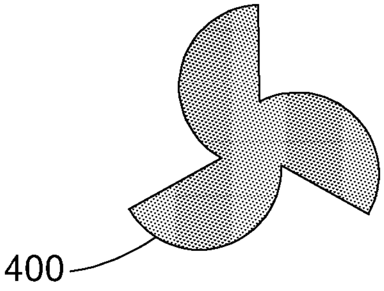
FIG. 11A is a schematic illustration of a radiating element in accordance with an embodiment.
Figure 11B:
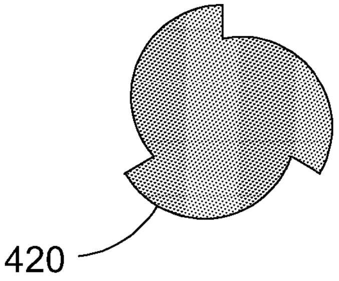
FIG. 11B is a schematic illustration of a radiating element in accordance with an embodiment.

FIG. 11A also shows the same radiating element 400 as FIG. 9, but uses a different representation in which the area of the radiating element 400 is shown as a filled shape instead of as a void. FIG. 11B shows a further radiating element 420 using the same type of representation as FIG. 11A. A shape of the further radiating element 420 is formed of D-shaped component parts having the same size and shape as those of the radiating element 400 of FIG. 11A, but the distance Cr between the centre of the straight side of a D-shaped arm and its rotational point is reduced in the radiating element of FIG. 11B.

Figure 12A:
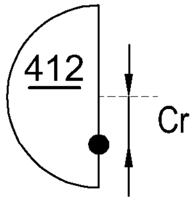
FIG. 12A is a schematic illustration of a D-shaped component part of the shape of the radiating element of FIG. 11A.
Figure 12B:
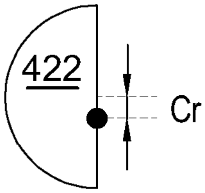
FIG. 12B is a schematic illustration of a D-shaped component part of the shape of the radiating element of FIG. 11B.

FIG. 12A shows one of the D-shaped component parts 412 of the radiating element 400 and shows the position of the rotational point as a bold dot. FIG. 12B shows one of the D-shaped component parts 422 of radiating element 420. In D-shaped component part 422, the rotational point is closer to the centre of the straight side than was the case in D-shaped component part 412 of FIG. 12A.

Figure 13A:
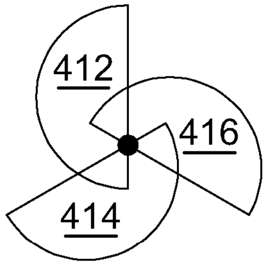
FIG. 13A is a schematic illustration of a combination of D-shaped components parts to form the shape of the radiating element of FIG. 11A.
Figure 13B:
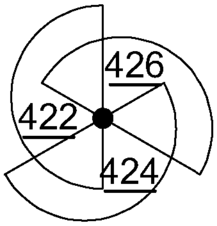
FIG. 13B is a schematic illustration of a combination of D-shaped components parts to form the shape of the radiating element of FIG. 11B.

FIG. 13A shows the D-shaped component parts 412, 414, 416 in combination, forming the shape of the rotational element 400. FIG. 13B shows D-shaped component parts 422, 424, 426 in combination, where D-shaped component parts 422, 424, 426 each have the same distance Cr to the rotational point. D-shaped component parts 422, 424, 426 are combined so that their rotational points are aligned with a central point. The reduced distance Cr results in greater overlapping of the D-shaped component parts 422, 424, 426 than was the case for the D-shaped component parts 412, 414, 416 of rotational element 400. The shape of rotational element 420 is the union of the shapes of D-shaped component parts 422, 424, 426.

Figure 14:
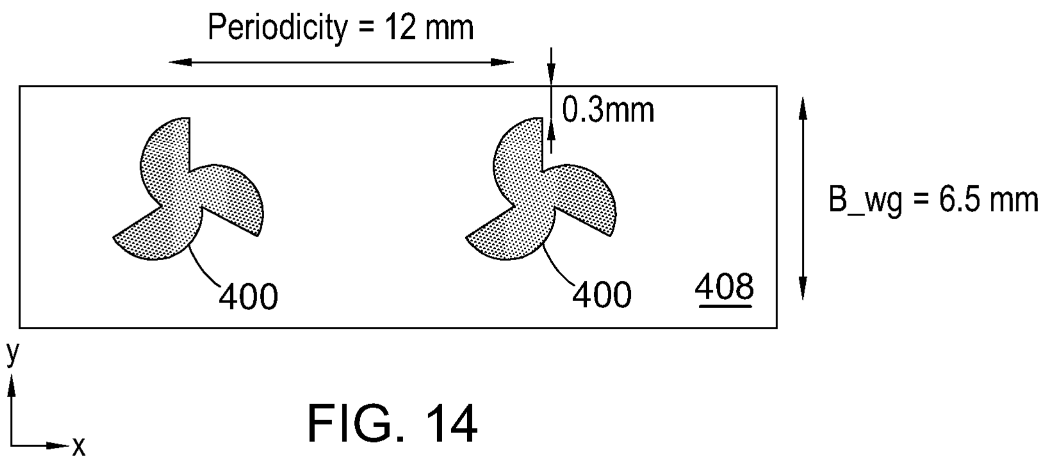
FIG. 14 is a schematic illustration of an array of radiating elements in accordance with an embodiment.

FIG. 14 shows two radiating elements 400 arranged within a wall 408 of a waveguide. The wall may also be referred to as a radiating face. Although only two radiating elements 400 are shown in FIG. 14 for clarity, in practice a greater number of radiating elements 400 may be used to form a linear array. For example, radiating elements 400 may be substituted for bent slot elements in meandered leaky-wave antenna 100 as described above.

The wall 408 has a width B_wg in the y direction, which is the direction of a short edge of the wall. In the embodiment shown in FIG. 14, B_wg=6.5 mm. Each radiating element 400 is spaced away from a long edge of the wall 408 by a y spacing of 0.3 mm. In other embodiments, a different waveguide width and/or y spacing of the elements may be used. For example, a minimum spacing between the radiating elements and the long edge of the wall 408 may be 0.2 mm. The spacing between the radiating elements and the long edge of the wall 308 may be less than 30% of the width B_wg. In general, if the size of the radiating element is smaller, the spacing between the radiating element and the wall will be greater. The positioning of the radiating elements 400 is further described below with reference to FIG. 21.

Neighbouring radiating elements 400 are spaced apart by a periodicity of 12 mm in the x direction. In other embodiments, any suitable separation of elements may be used. A spacing between radiating elements 400 may be selected to avoid grating lobes on beam steering.

For each radiating element 400 of FIG. 14, a straight side of one of the arms of the radiating element 400 is aligned with the y axis. All of the radiating elements 400 are aligned with the y axis in the same way.

Figure 15:
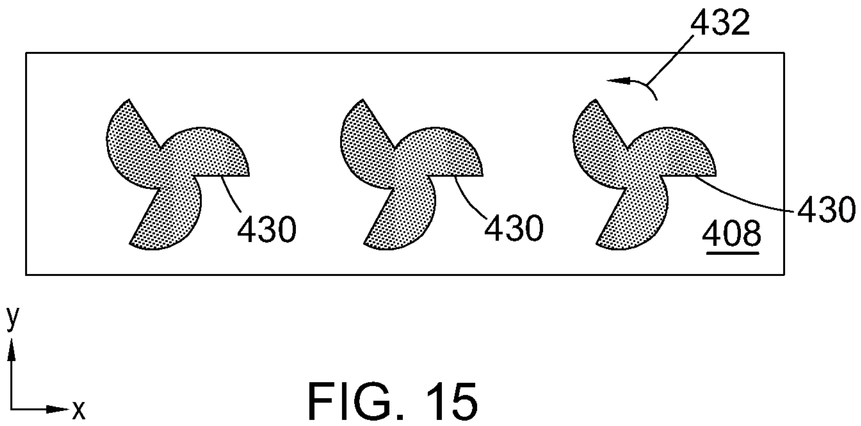
FIG. 15 is a schematic illustration of an array of radiating elements in accordance with an embodiment.

FIG. 15 shows a further embodiment in which radiating elements 430 are similar to radiating elements 400 of FIG. 14, but are rotated anticlockwise in the x-y plane by 30 degrees as shown by an arrow 432 in FIG. 15. For each of the radiating elements 430, a straight side of one of the arms of the radiating element 430 is aligned with the x axis. In the embodiment of FIG. 15, axial ratio is improved by rotating the radiating element 430 around the z axis. In other embodiments, any rotational positioning of radiating elements may be used.

Although only three radiating elements 430 are shown in FIG. 14 for clarity, in practice a greater number of radiating elements 430 may be used to form a linear array. For example, radiating elements 430 may be substituted for bent slot elements in meandered leaky-wave antenna 100 as described above.

Figure 16:
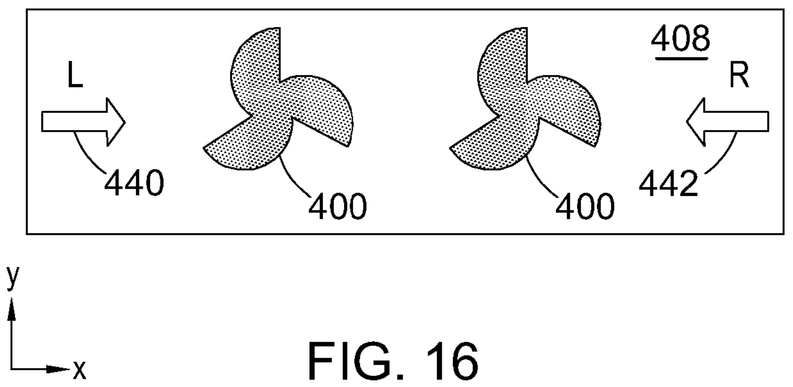
FIG. 16 is a schematic illustration of an array of radiating elements in accordance with an embodiment.

FIG. 16 shows an array of radiating elements 400 similar to those described with reference to FIGS. 9 and 14. Radiating elements 400 are spaced along a wall 408 of a waveguide. The waveguide has a left port (not shown) positioned at a first end of the waveguide and a right port (not shown) positioned at a second, opposite end of the waveguide.

FIG. 16 schematically depicts radiation from the left port as a first arrow 440. Radiation from the left port enters the waveguide from the left side as depicted in FIG. 16, and is radiated from the radiating elements 400. FIG. 16 schematically depicts radiation from the right port as a first arrow 442. Radiation from the right port enters the waveguide from the right side, and is radiated from the radiating elements 400. Radiation may be provided by the right port or the left port at any given time. Excitation from the right port results in radiation having an opposite circular polarisation when compared with excitation from the left port. The array of radiating elements 400 may be used to radiate, or to receive, left hand circularly polarised radiation or right hand circularly polarised radiation, in dependence on the port used.

The radiating elements 400 are antisymmetric relative to the right and left ports, in that a wave coming from the right port will see a different radiating element than a wave coming from the left port. The radiating elements 400 may easily radiate at broadside.

Figure 17:
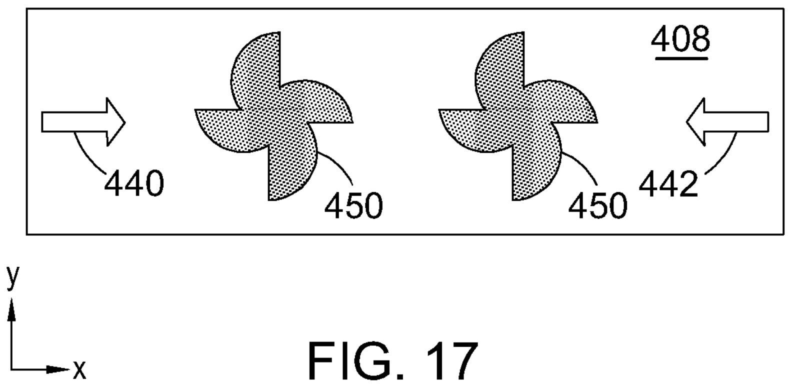
FIG. 17 is a schematic illustration of an array of radiating elements in accordance with an embodiment.

FIG. 17 shows an array of further radiating elements 450. Each of the further radiating elements 450 has four D-shaped arms. A straight side of first one of the D-shaped arms is aligned with the y axis, and others of the D-shaped arms are arranged at 90 degree intervals such that the radiating element 430 has a rotational symmetry of order 4.

The symmetry of the radiating elements 450 results in an axial ratio that is identical by left or right excitation. If the waveguide of FIG. 17 were to be rotated by 180 degrees around the x-axis, it would look the same as it does in FIG. 17. Exciting the radiating elements from the right port results in the same axial ratio as excitation from the left port.

Figure 18:
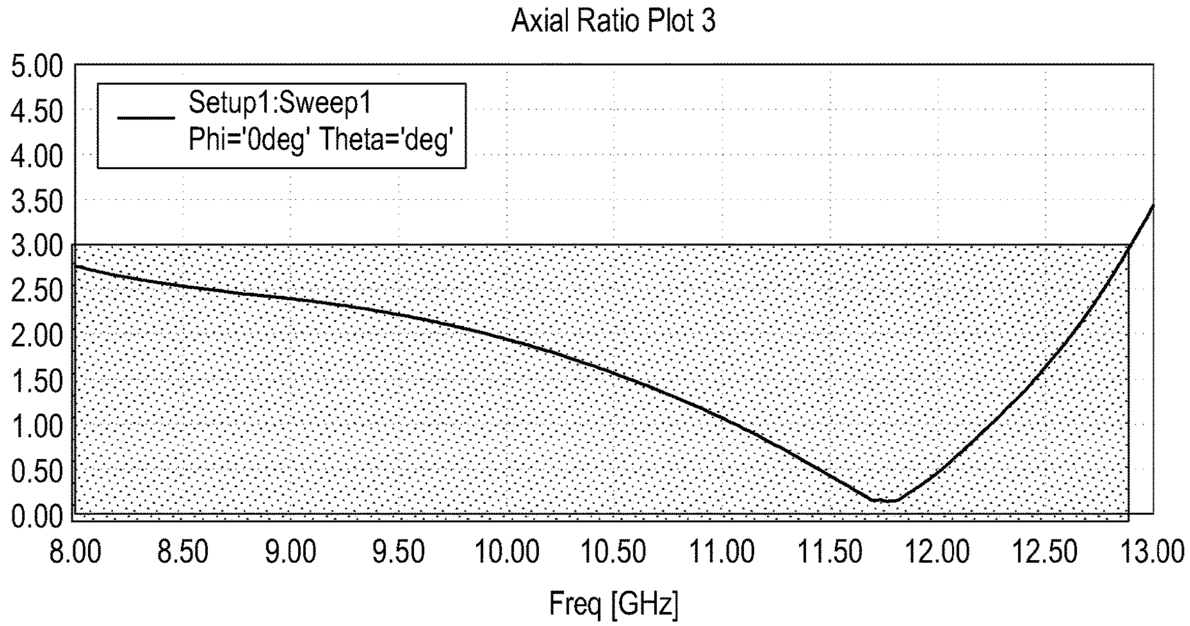
FIG. 18 is a plot of axial ratio versus frequency.

FIG. 18 is a plot of axial ratio versus frequency for an array of radiating elements 400, at broadside. An axial ratio below 3 is achieved for a bandwidth from 8 GHz to 12.8 GHz.

Figure 19:
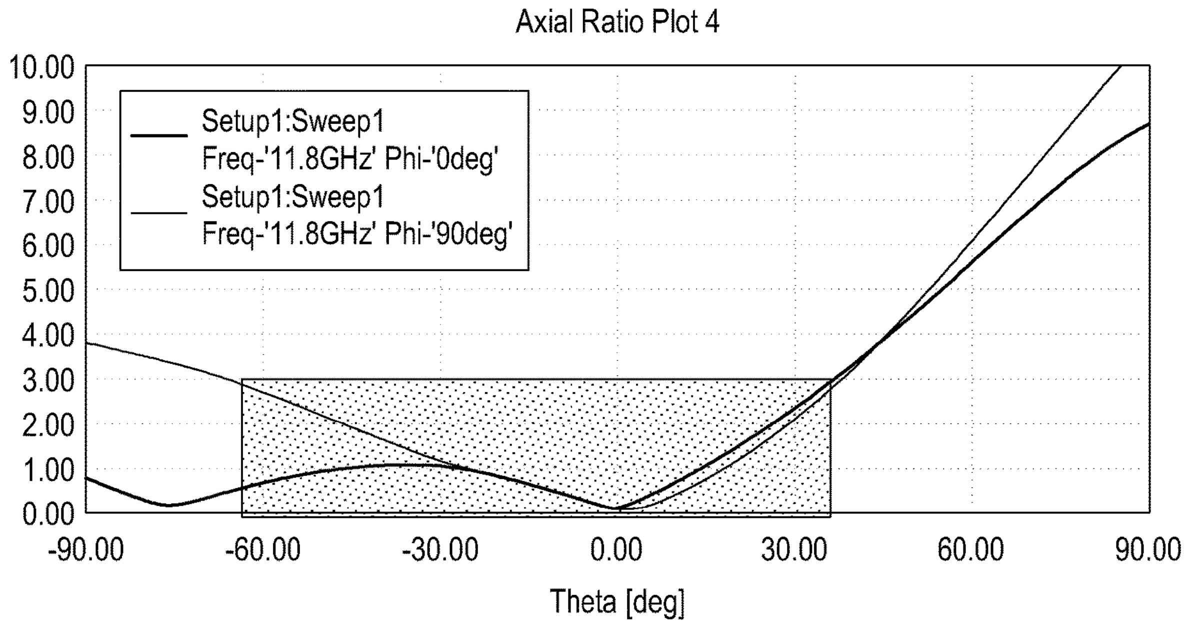
FIG. 19 is a plot of axial ratio versus elevation angle.

FIG. 19 is a plot of axial ratio versus steering angle for an array of radiating elements 400, at a frequency of 11.8 GHz. An axial ratio below 3 is achieved for a range of angles from below −60 degrees to above +30 degrees in both azimuth and elevation.

Figure 20:
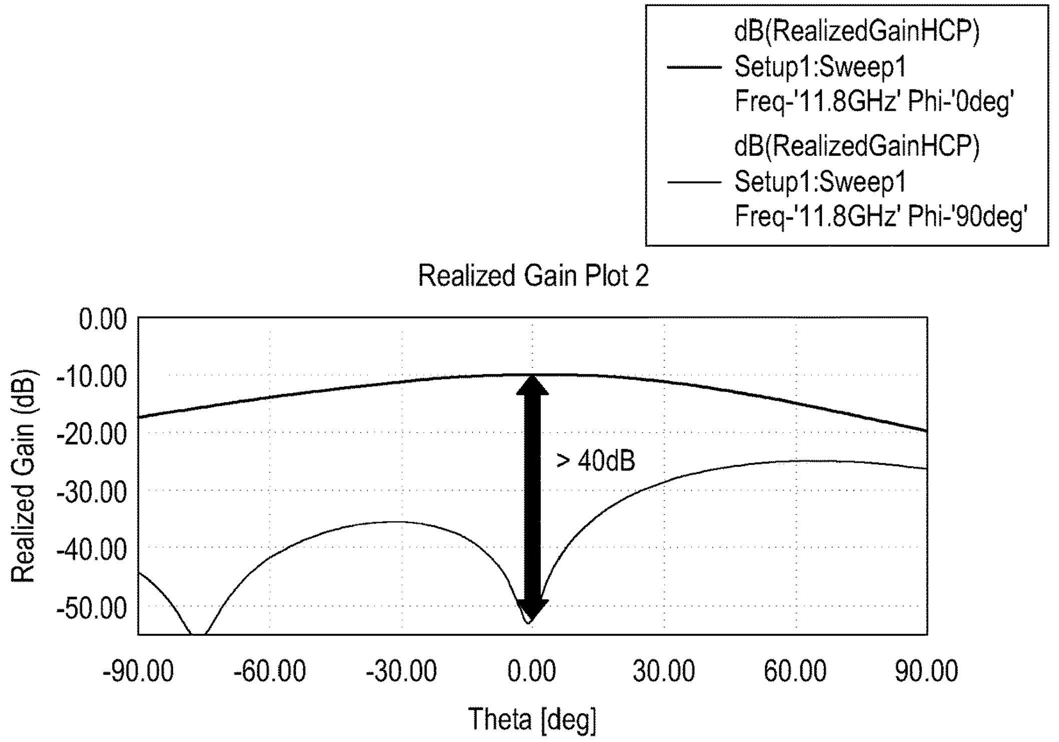
FIG. 20 is a plot of gain versus elevation angle.

FIG. 20 is a plot showing cross-polarisation against elevation angle for a single radiating element 400 as shown in FIG. 9. With left-port excitation, right-hand circular polarised (RHCP) radiation is obtained with high polarisation isolation. The RHCP pattern is symmetric versus the elevation. Polarisation isolation of greater than 40 dB is obtained at broadside.

Figure 21:
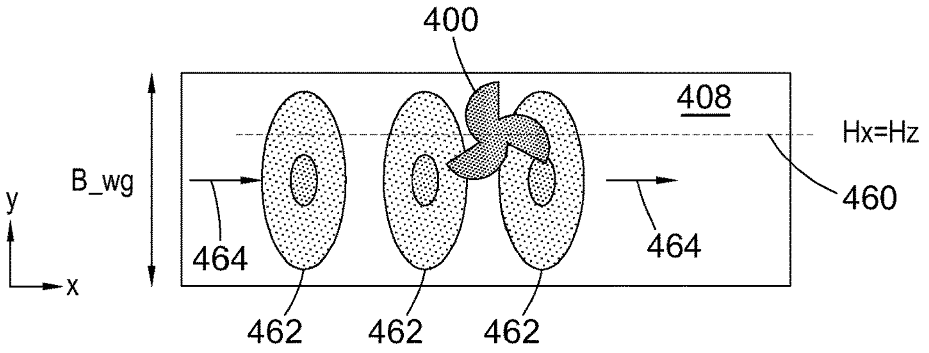
FIG. 21 is a schematic illustration a radiating element positioned on a waveguide in accordance with an embodiment.
Figure 22:
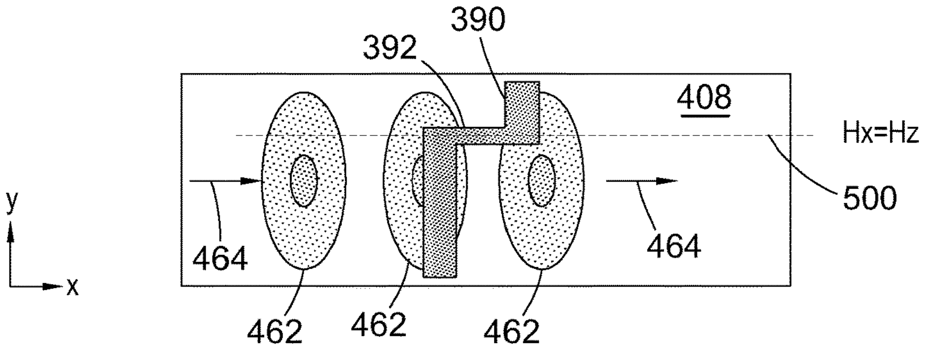
FIG. 22 is a schematic illustration of a Z-shaped slot positioned on a waveguide in accordance with an embodiment.

FIGS. 21 and 22 show positioning of elements relative to a waveguide in order to obtain circular polarisation. In FIG.

21 and FIG. 22, propagating radiation is represented by ellipses 462 and a direction of propagation is represented by arrows 464.

In order to obtain circular polarisation, a slot element may be placed not in the centre of the waveguide, but in a position where the x and z components of the magnetic field propagating in the waveguide are equal, Hz=Hx. In many embodiments, a line at which the x and z components of the magnetic field is equal is not aligned with a centre of the radiating face of the waveguide and so the slot elements may be shifted with regard to a centre line of the radiating face.

FIG. 21 shows an embodiment in a radiating element 400 as described above with regard to FIG. 9 is formed in a radiating face 408 and is positioned such that the radiating element 400 is offset from a longitudinal centre line of the waveguide and occupies a position on a line 460 in which Hz=Hx. In other embodiments, the radiating elements 400 may be shifted in the y direction towards either the top or the bottom of the radiating face of the waveguide.

The position of the line 460 where Hz=Hz may vary depending on the size of the waveguide. The position of the line 460 where Hz=Hx may vary depending on the size of a ridge within the waveguide and/or on a position of the ridge within the waveguide.

FIG. 22 shows an embodiment in which a Z-shaped element 390 is arranged to obtain circular polarization. A central portion 392 of the Z-shaped element is shifted such that it is offset from a longitudinal centre line of the waveguide. The central portion 392 is aligned with a line 460 at which Hz=Hx. In other embodiments, the central portion 392 may be shifted in the y direction towards either the top or the bottom of the radiating face of the waveguide.

While particular dimensions of radiating element 400 are described above, in other embodiments any suitable dimensions may be used, for example any suitable values of R and Cr. The radiating element 400 may be scaled for use in any suitable frequency band, for example Ku band or Ka band.

A radiating element having D-shaped arms (for example, radiating element 400, 420, 430 or 450, or a variant having different dimensions and/or a different number of arms) may be provided in combination with any antenna features described above, for example a ridged waveguide and/or parasitic elements as described above. The radiating element 400, 420, 430, 450 may be formed in two parts in a similar fashion to that described with reference to FIGS. 3F and 7.

In some embodiments, radiating elements having D-shaped arms (for example, radiating element 400, 420, 430 or 450, or a variant having different dimensions and/or a different number of arms) may be formed on a printed circuit board (PCB). The radiating elements 400 may be formed as slots in a metal layer of a PCB. The PCB may further comprise a dielectric substrate and a ground plane. In such embodiments, the antenna may be a PCB leaky wave antenna.

Figure 23A:
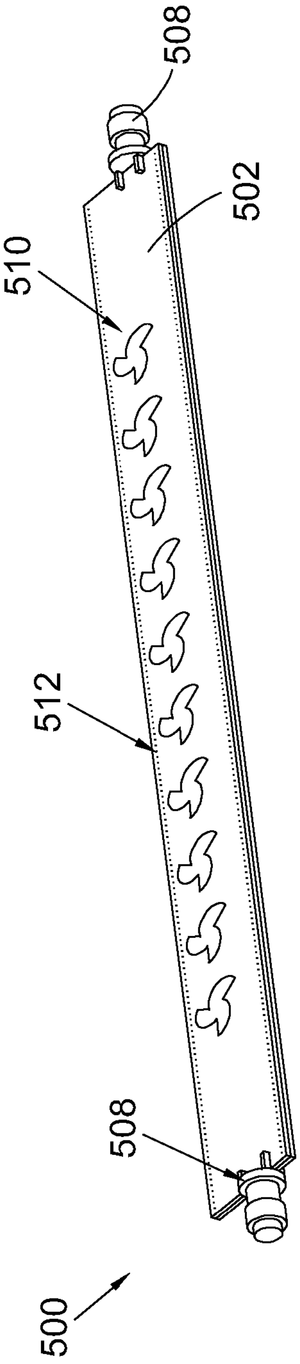
FIG. 23A is a schematic illustration of first view of a substrate integrated waveguide antenna in accordance with an embodiment.
Figure 23B:
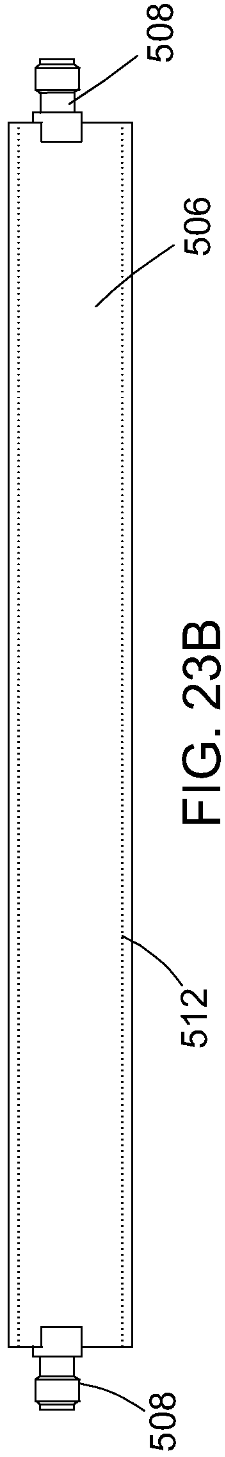
FIG. 23B is a schematic illustration of a second view of the substrate integrated waveguide antenna of FIG. 23A.
Figure 23C:
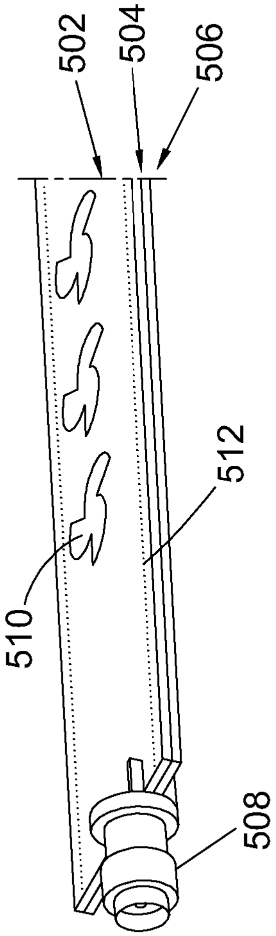
FIG. 23C is a schematic illustration of a third view of the substrate integrated waveguide antenna of FIG. 23A.

FIGS. 23A, 23B and 23C illustrate respective views of an embodiment in which the waveguide is a substrate integrated waveguide 500. A copper upper layer 502 and a copper ground plane 506 are formed on a substrate 504, which in the embodiment of FIGS. 23A, 23B and 23C comprises a Rogers RT5880 substrate. A set of radiating elements 510 with D-shaped arms are formed in the upper layer 502. In use, radiation travels from an SMA connector 508 through a waveguide that is delimited by a set of vias 512 that emulate a metallic wall and is emitted by the radiating elements 510, or is received by the radiating elements and passed through the waveguide to the SMA connector 508. The waveguide comprises a microstrip line, which in some embodiments is a ridged microstrip line.

An antenna may comprise a one-dimensional array of radiating elements 510, or multiple one-dimensional arrays combined to form a two-dimensional array.

Figure 24:
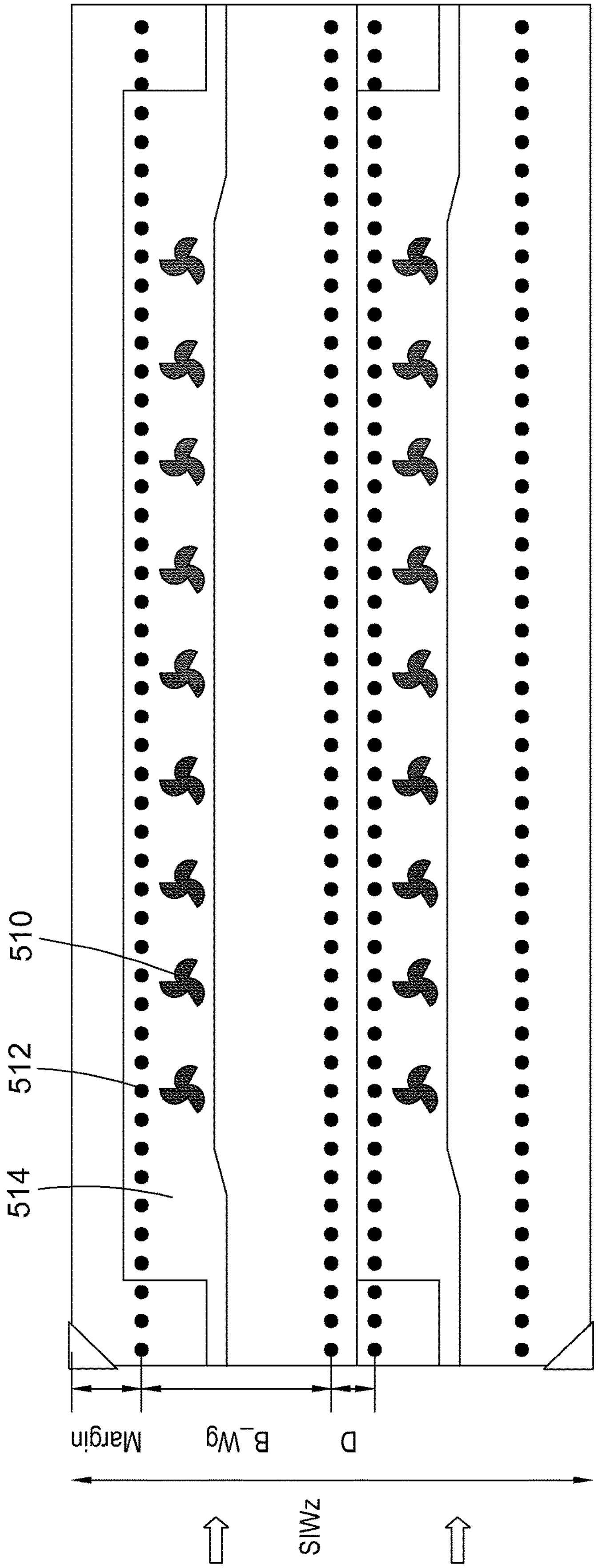
FIG. 24 is a schematic illustration of a two-dimensional substrate integrated waveguide antenna in accordance with an embodiment.

FIG. 24 illustrates an embodiment in which a plurality of one-dimensional arrays are combined. FIG. 24 is illustrated so as to shown an interior of the waveguides. For each waveguide, a ridged microstrip line 514 is coupled to the SMA connectors 508 (not shown in FIG. 24) and is used to feed the radiating elements 510. Although only two waveguides are pictured in FIG. 24, in practice any number of waveguides may be used.

A waveguide width is designated as B_wg. A margin between an edge of the substrate and the vias is designated as Margin. A spacing between vias of a first waveguide and vias of a second waveguide is designated as D. A total substrate width is designated as SIWz=Nwg*B_wg+D*(Nwg−1)+2*Margin, wherein Nwg is a number of waveguides. In an exemplary embodiment, Margin=2 cm, B_wg=8 mm and a number of waveguides Nwg=32. SIWz may be between 40 cm and 45 cm. A length of the waveguides may be between 41 cm and 50 cm. In the embodiment of FIG. 24, a radius of each via, Radius_Via, is 0.15 mm. A separation of the vias, Dist_Via, is 0.5 mm.

In other embodiments, any suitable parameter values may be used in place of those described above for FIG. 24. Any of the features or parameters described with regard to the antennas of FIGS. 9 to 17 may be combined with features or parameters of FIGS. 23A to 24.

A one-dimensional or two-dimensional array of any of the radiating elements described above may be formed. Phase variation between elements of the array may be used for beam steering.

A skilled person will appreciate that variations of the enclosed arrangement are possible without departing from the invention. Accordingly, the above description of the specific embodiments is made by way of example only and not for the purposes of limitations. It will be clear to the skilled person that minor modifications may be made without significant changes to the operation described.

The invention claimed is:

1. A radio-frequency (RF) antenna comprising a radiating element comprising a plurality n of D-shaped arms, each extending in a respective radial direction relative to a centre of the radiating element and substantially equally spaced around the centre, such that the radiating element is rotationally symmetric.

2. An antenna according to claim 1, wherein the radiating element has a rotational symmetry of order n, wherein n is at least 3, optionally wherein n is at least 4.

3. An antenna according to claim 1, wherein at least one of a) and b):

a) a shape of the radiating element is a union of n overlapping D-shaped component shapes;

b) each of the D-shaped component shapes is semi-circular or semi-elliptical.

4. An antenna according to claim 1, wherein the radiating element is one of a linear array of radiating elements each having n D-shaped arms the antenna further comprising a first port configured to receive RF radiation and a waveguide coupled to the first port, wherein each radiating element is formed from or coupled to the waveguide, such that RF radiation received through the first port passes through the waveguide and is emitted through the radiating elements and/or RF radiation received through the radiating elements passes through the waveguide to the first port.

5. An antenna according to claim 2, the antenna further comprising a first port and a second port, wherein the first port is coupled to a first end of the waveguide and the second port is coupled to a second end of the waveguide, such that RF radiation received through the first port is emitted through the radiating elements with a first circular polarisation, and RF radiation received through the second port is emitted through the radiating elements with a second, different circular polarisation.

6. An antenna according to claim 4, wherein at least one of a) to c):

a) the waveguide is a metallic waveguide;

b) the waveguide is a substrate integrated waveguide;

c) the radiating element or radiating elements are formed on a printed circuit board (PCB).

* * * * *